(12) United States Patent
Smith

(10) Patent No.: US 9,449,313 B2
(45) Date of Patent: *Sep. 20, 2016

(54) CUSTOMER TO SUPPLIER FUNDS TRANSFER

(75) Inventor: Glyn Barry Smith, Chesterfield (GB)

(73) Assignee: Boku, Inc., San Francisco, CA (US)

( * ) Notice: Subject to any disclaimer, the term of this patent is extended or adjusted under 35 U.S.C. 154(b) by 1114 days.

This patent is subject to a terminal disclaimer.

(21) Appl. No.: 13/541,409

(22) Filed: Jul. 3, 2012

(65) Prior Publication Data

US 2012/0278152 A1 Nov. 1, 2012

Related U.S. Application Data

(63) Continuation of application No. 12/413,474, filed on Mar. 27, 2009, now abandoned.

(30) Foreign Application Priority Data

May 23, 2008 (GB) .................................. 0809383.3

(51) Int. Cl.
| | |
|---|---|
| G06Q 30/00 | (2012.01) |
| G06Q 40/00 | (2012.01) |
| G06Q 20/12 | (2012.01) |
| G06Q 20/10 | (2012.01) |
| G06Q 20/32 | (2012.01) |
| G06Q 30/06 | (2012.01) |

(52) U.S. Cl.
CPC .............. *G06Q 20/12* (2013.01); *G06Q 20/10* (2013.01); *G06Q 20/3223* (2013.01); *G06Q 30/0601* (2013.01)

(58) Field of Classification Search
None
See application file for complete search history.

(56) References Cited

U.S. PATENT DOCUMENTS

| 5,283,829 A | 2/1994 | Anderson |
| 5,708,422 A | 1/1998 | Blonder et al. |
| 5,845,260 A | 12/1998 | Nakano et al. |

(Continued)

FOREIGN PATENT DOCUMENTS

| GB | 2379525 | 3/2003 |
| JP | 2007109014 | 4/2007 |

(Continued)

OTHER PUBLICATIONS

International Application No. PCT/US2011/029760, International Search Report and Written Opinion Oct. 28, 2011.

(Continued)

*Primary Examiner* — Ariel Yu
(74) *Attorney, Agent, or Firm* — Stephen M. De Klerk

(57) ABSTRACT

Apparatuses and methods to facilitate customer to supplier funds transfer via premium messages. In one aspect, an apparatus to electronically transfer funds from a customer to a supplier includes: a server component connected to a network; and a database coupled to the server component. The server component is configured to: transmit a plurality of premium rate mobile terminating text messages to the mobile cellular telephone to effect a payment from the customer to the supplier after the customer has placed an order with a supplier; populate the database with an identification of the telephone number of the customer; populate the database with at least one transaction record related to the premium rate text messages; and facilitate access to the transaction record by the customer via the telephone number of the customer.

15 Claims, 20 Drawing Sheets

(56) References Cited

U.S. PATENT DOCUMENTS

| | | |
|---|---|---|
| 5,905,873 A | 5/1999 | Hartmann et al. |
| 5,914,472 A | 6/1999 | Foladare et al. |
| 5,953,710 A | 9/1999 | Fleming |
| 6,227,447 B1 | 5/2001 | Campisano |
| 6,282,276 B1 | 8/2001 | Felger |
| 6,302,326 B1 | 10/2001 | Symonds et al. |
| 6,473,808 B1 | 10/2002 | Yeivin et al. |
| 6,612,488 B2 | 9/2003 | Suzuki |
| 6,704,409 B1 | 3/2004 | Dilip et al. |
| 6,718,178 B1 | 4/2004 | Sladek et al. |
| 6,732,919 B2 | 5/2004 | Macklin et al. |
| 6,788,771 B2 | 9/2004 | Manto |
| 6,807,410 B1 | 10/2004 | Pailles et al. |
| 6,928,558 B1 | 8/2005 | Allahwerdi et al. |
| 6,965,872 B1 | 11/2005 | Grdina |
| 6,996,409 B2 | 2/2006 | Gopinath et al. |
| 7,013,125 B2 | 3/2006 | Henrikson et al. |
| 7,089,208 B1 | 8/2006 | Levchin et al. |
| 7,107,068 B2 | 9/2006 | Benzon et al. |
| 7,174,301 B2 | 2/2007 | Florance et al. |
| 7,221,951 B2 | 5/2007 | Anvekar et al. |
| 7,292,996 B2 | 11/2007 | Nobrega et al. |
| 7,308,254 B1 | 12/2007 | Rissanen |
| 7,315,541 B1 | 1/2008 | Housel et al. |
| 7,331,518 B2 | 2/2008 | Rable |
| 7,357,310 B2 | 4/2008 | Calabrese et al. |
| 7,366,702 B2 | 4/2008 | David |
| 7,374,079 B2 | 5/2008 | Nam et al. |
| 7,386,477 B2 | 6/2008 | Fano |
| 7,413,119 B2 | 8/2008 | Kubo et al. |
| 7,437,331 B1 | 10/2008 | Rosenberger |
| 7,458,507 B2 | 12/2008 | Fillinger et al. |
| 7,478,055 B2 | 1/2009 | Goino |
| 7,487,114 B2 | 2/2009 | Florance et al. |
| 7,527,192 B1 | 5/2009 | Chaskin et al. |
| 7,546,266 B2 | 6/2009 | Beirne et al. |
| 7,558,777 B1 | 7/2009 | Santos |
| 7,660,772 B2 | 2/2010 | Verkama |
| 7,748,614 B2 | 7/2010 | Brown |
| 7,752,135 B2 | 7/2010 | Brown et al. |
| 7,792,518 B2 | 9/2010 | Trioano et al. |
| 7,848,500 B2 | 12/2010 | Lynam et al. |
| 7,848,980 B2 | 12/2010 | Carlson |
| 7,870,044 B2 | 1/2011 | Robertson |
| 7,870,077 B2 | 1/2011 | Woo et al. |
| 7,890,433 B2 | 2/2011 | Singhal |
| 8,024,781 B2 | 9/2011 | Saunders et al. |
| 8,073,774 B2 | 12/2011 | Pousti |
| 8,116,730 B2 | 2/2012 | Smith |
| 8,280,906 B1 | 10/2012 | Lillibridge et al. |
| 2001/0003093 A1 | 6/2001 | Lundin |
| 2001/0037264 A1* | 11/2001 | Husemann ............ G06Q 20/04 705/26.81 |
| 2001/0051920 A1 | 12/2001 | Joao et al. |
| 2002/0004751 A1 | 1/2002 | Seki et al. |
| 2002/0013727 A1 | 1/2002 | Lee |
| 2002/0016769 A1 | 2/2002 | Barbara et al. |
| 2002/0025797 A1 | 2/2002 | Joao et al. |
| 2002/0035539 A1 | 3/2002 | O'Connell |
| 2002/0059146 A1 | 5/2002 | Keech |
| 2002/0087471 A1 | 7/2002 | Ganesan et al. |
| 2002/0111907 A1 | 8/2002 | Ling |
| 2002/0111908 A1 | 8/2002 | Milberger et al. |
| 2002/0120582 A1 | 8/2002 | Elston et al. |
| 2002/0193094 A1 | 12/2002 | Lawless et al. |
| 2003/0023505 A1 | 1/2003 | Eglen et al. |
| 2003/0050854 A1 | 3/2003 | Showghi et al. |
| 2003/0065525 A1 | 4/2003 | Giacchetti et al. |
| 2003/0119478 A1 | 6/2003 | Nagy et al. |
| 2003/0125969 A1 | 7/2003 | Kizer et al. |
| 2003/0126076 A1 | 7/2003 | Kwok |
| 2003/0191711 A1 | 10/2003 | Jamison et al. |
| 2003/0212601 A1 | 11/2003 | Silva et al. |
| 2004/0019564 A1 | 1/2004 | Goldthwaite et al. |
| 2004/0044582 A1 | 3/2004 | Chowdhary |
| 2004/0122685 A1 | 6/2004 | Bunce |
| 2004/0185827 A1 | 9/2004 | Parks |
| 2004/0230527 A1 | 11/2004 | Hansen et al. |
| 2004/0248596 A1 | 12/2004 | Panchal |
| 2004/0252814 A1 | 12/2004 | Eakin |
| 2004/0254868 A1 | 12/2004 | Kirkland et al. |
| 2005/0055296 A1 | 3/2005 | Hattersley et al. |
| 2005/0055309 A1 | 3/2005 | Williams et al. |
| 2005/0086164 A1 | 4/2005 | Kim et al. |
| 2005/0144020 A1 | 6/2005 | Muzaffar et al. |
| 2005/0177442 A1 | 8/2005 | Sullivan et al. |
| 2005/0177517 A1 | 8/2005 | Leung et al. |
| 2005/0197892 A1 | 9/2005 | Bilibin et al. |
| 2005/0199709 A1 | 9/2005 | Linlor |
| 2005/0245257 A1 | 11/2005 | Woodhill |
| 2006/0018450 A1 | 1/2006 | Sandberg-Diment |
| 2006/0121880 A1 | 6/2006 | Cowsar et al. |
| 2006/0131390 A1* | 6/2006 | Kim ...................... G06Q 20/24 235/380 |
| 2006/0149668 A1* | 7/2006 | Zafrir ................... G06Q 20/04 705/39 |
| 2006/0206709 A1 | 9/2006 | Labrou et al. |
| 2006/0248011 A1 | 11/2006 | Hecht-Nielsen |
| 2006/0253335 A1 | 11/2006 | Keena et al. |
| 2006/0258331 A1 | 11/2006 | Syrett et al. |
| 2006/0259438 A1 | 11/2006 | Randle et al. |
| 2006/0276171 A1 | 12/2006 | Pousti |
| 2006/0294025 A1 | 12/2006 | Mengerink |
| 2007/0005467 A1 | 1/2007 | Haigh et al. |
| 2007/0011104 A1 | 1/2007 | Leger et al. |
| 2007/0022019 A1 | 1/2007 | Sherwin et al. |
| 2007/0027775 A1 | 2/2007 | Hwang |
| 2007/0027803 A1 | 2/2007 | Brandes et al. |
| 2007/0038522 A1* | 2/2007 | Bell ...................... G06Q 30/06 705/26.8 |
| 2007/0043664 A1 | 2/2007 | Wilkes |
| 2007/0055440 A1 | 3/2007 | Denker et al. |
| 2007/0061244 A1 | 3/2007 | Ramer et al. |
| 2007/0094080 A1 | 4/2007 | Wilken |
| 2007/0100651 A1 | 5/2007 | Ramer et al. |
| 2007/0118477 A1 | 5/2007 | Graves et al. |
| 2007/0123219 A1 | 5/2007 | Lovell, Jr. |
| 2007/0123229 A1 | 5/2007 | Pousti |
| 2007/0124490 A1 | 5/2007 | Kalavade et al. |
| 2007/0130025 A1 | 6/2007 | Nakajima |
| 2007/0130044 A1 | 6/2007 | Rowan |
| 2007/0133768 A1 | 6/2007 | Singh |
| 2007/0156517 A1 | 7/2007 | Kaplan et al. |
| 2007/0168462 A1 | 7/2007 | Grossberg et al. |
| 2007/0175978 A1 | 8/2007 | Stambaugh |
| 2007/0198510 A1 | 8/2007 | Ebanks |
| 2007/0203792 A1 | 8/2007 | Rao |
| 2007/0203836 A1 | 8/2007 | Dodin |
| 2007/0208632 A1 | 9/2007 | Downes et al. |
| 2007/0233597 A1 | 10/2007 | Petersen et al. |
| 2007/0244731 A1 | 10/2007 | Barhydt et al. |
| 2007/0244811 A1 | 10/2007 | Tumminaro et al. |
| 2007/0250711 A1 | 10/2007 | Storey |
| 2007/0255653 A1 | 11/2007 | Tumminard et al. |
| 2007/0255662 A1 | 11/2007 | Tumminaro et al. |
| 2007/0260556 A1* | 11/2007 | Pousti ................... G06Q 20/14 705/75 |
| 2007/0265921 A1 | 11/2007 | Rempe et al. |
| 2007/0266034 A1 | 11/2007 | Pousti |
| 2007/0266130 A1 | 11/2007 | Mazur et al. |
| 2007/0270125 A1 | 11/2007 | Pousti |
| 2008/0009263 A1 | 1/2008 | Pousti |
| 2008/0010192 A1 | 1/2008 | Rackley, III et al. |
| 2008/0040139 A1 | 2/2008 | Pousti |
| 2008/0040265 A1 | 2/2008 | Rackley, III et al. |
| 2008/0040733 A1 | 2/2008 | Pousti |
| 2008/0051122 A1 | 2/2008 | Fisher |
| 2008/0052091 A1 | 2/2008 | Vawter |
| 2008/0052363 A1 | 2/2008 | Pousti |
| 2008/0057904 A1 | 3/2008 | Pousti |
| 2008/0082509 A1 | 4/2008 | Bessieres et al. |
| 2008/0091614 A1 | 4/2008 | Bas Bayod et al. |
| 2008/0097851 A1 | 4/2008 | Bemmel et al. |
| 2008/0103984 A1 | 5/2008 | Choe et al. |

(56) References Cited

U.S. PATENT DOCUMENTS

| | | |
|---|---|---|
| 2008/0109279 A1 | 5/2008 | Csoka |
| 2008/0109528 A1 | 5/2008 | Knight et al. |
| 2008/0120698 A1 | 5/2008 | Ramia |
| 2008/0126145 A1 | 5/2008 | Rackley, III et al. |
| 2008/0133403 A1 | 6/2008 | Hamzeh |
| 2008/0133735 A1 | 6/2008 | Thayer et al. |
| 2008/0140569 A1 | 6/2008 | Handel |
| 2008/0154727 A1 | 6/2008 | Carlson |
| 2008/0154772 A1 | 6/2008 | Carlson |
| 2008/0167017 A1 | 7/2008 | Wentker et al. |
| 2008/0177628 A1 | 7/2008 | Payette |
| 2008/0177661 A1 | 7/2008 | Mehra |
| 2008/0189186 A1 | 8/2008 | Choi et al. |
| 2008/0189211 A1 | 8/2008 | Obadia et al. |
| 2008/0201201 A1 | 8/2008 | Pousti |
| 2008/0208739 A1 | 8/2008 | Phillips |
| 2008/0217397 A1* | 9/2008 | Degliantoni ............ G06Q 30/02 235/380 |
| 2008/0228595 A1 | 9/2008 | Hill et al. |
| 2008/0233918 A1 | 9/2008 | Pousti |
| 2008/0262929 A1 | 10/2008 | Behr |
| 2008/0275779 A1 | 11/2008 | Lakshminarayanan |
| 2008/0279360 A1 | 11/2008 | Veenstra et al. |
| 2008/0281726 A1 | 11/2008 | Gupta |
| 2008/0287095 A1 | 11/2008 | Pousti |
| 2008/0288299 A1 | 11/2008 | Schultz |
| 2008/0288351 A1 | 11/2008 | Leung et al. |
| 2008/0307317 A1 | 12/2008 | Yohai-Giochais |
| 2009/0006184 A1 | 1/2009 | Leach et al. |
| 2009/0006217 A1 | 1/2009 | Smith |
| 2009/0024614 A1 | 1/2009 | Pousti |
| 2009/0029687 A1 | 1/2009 | Ramer et al. |
| 2009/0044216 A1 | 2/2009 | McNicoll |
| 2009/0055292 A1 | 2/2009 | Chong et al. |
| 2009/0063178 A1 | 3/2009 | Pousti et al. |
| 2009/0063312 A1 | 3/2009 | Hurst |
| 2009/0070583 A1 | 3/2009 | Von Mueller et al. |
| 2009/0077640 A1 | 3/2009 | Wang |
| 2009/0081989 A1 | 3/2009 | Wuhrer |
| 2009/0104888 A1 | 4/2009 | Cox |
| 2009/0112765 A1 | 4/2009 | Skowronek |
| 2009/0112768 A1 | 4/2009 | Hammad et al. |
| 2009/0119190 A1 | 5/2009 | Realini |
| 2009/0124238 A1 | 5/2009 | Wilson |
| 2009/0150257 A1 | 6/2009 | Abrams et al. |
| 2009/0156170 A1 | 6/2009 | Rossano et al. |
| 2009/0157792 A1 | 6/2009 | Fiatal |
| 2009/0172402 A1 | 7/2009 | Tran |
| 2009/0177581 A1 | 7/2009 | Garcia et al. |
| 2009/0182634 A1 | 7/2009 | Park et al. |
| 2009/0182674 A1 | 7/2009 | Patel et al. |
| 2009/0192928 A1 | 7/2009 | Abifaker |
| 2009/0204546 A1 | 8/2009 | Haidar |
| 2009/0216687 A1 | 8/2009 | Burdick |
| 2009/0220060 A1 | 9/2009 | Wilson |
| 2009/0248483 A1 | 10/2009 | Kiefer |
| 2009/0265273 A1 | 10/2009 | Guntupalli et al. |
| 2009/0281904 A1 | 11/2009 | Pharris |
| 2010/0010911 A1 | 1/2010 | Smith |
| 2010/0015944 A1 | 1/2010 | Smith |
| 2010/0015957 A1 | 1/2010 | Smith |
| 2010/0017285 A1 | 1/2010 | Smith |
| 2010/0049654 A1 | 2/2010 | Pilo |
| 2010/0057623 A1 | 3/2010 | Kapur et al. |
| 2010/0070757 A1 | 3/2010 | Martinez |
| 2010/0094732 A1 | 4/2010 | Smith |
| 2010/0106620 A1 | 4/2010 | Marcus |
| 2010/0114775 A1 | 5/2010 | Griffen |
| 2010/0125514 A1 | 5/2010 | Blackhurst et al. |
| 2010/0130165 A1 | 5/2010 | Snyder et al. |
| 2010/0145802 A1 | 6/2010 | Nowacek et al. |
| 2010/0153249 A1 | 6/2010 | Yuan et al. |
| 2010/0179907 A1 | 7/2010 | Atkinson |
| 2010/0190471 A1 | 7/2010 | Smith |
| 2010/0191646 A1 | 7/2010 | Smith |
| 2010/0191648 A1 | 7/2010 | Smith |
| 2010/0216425 A1 | 8/2010 | Smith |
| 2010/0217696 A1 | 8/2010 | Schuba et al. |
| 2010/0223110 A1 | 9/2010 | Slavin et al. |
| 2010/0223183 A1 | 9/2010 | Smith |
| 2010/0228580 A1 | 9/2010 | Zoldi et al. |
| 2010/0235276 A1 | 9/2010 | Smith |
| 2010/0250359 A1 | 9/2010 | Gillenson et al. |
| 2010/0250687 A1 | 9/2010 | Smith |
| 2010/0267362 A1 | 10/2010 | Smith et al. |
| 2010/0293065 A1 | 11/2010 | Brody et al. |
| 2010/0299220 A1 | 11/2010 | Baskerville |
| 2010/0299731 A1 | 11/2010 | Atkinson |
| 2010/0306015 A1 | 12/2010 | Kingston |
| 2010/0306099 A1 | 12/2010 | Hirson |
| 2010/0306832 A1 | 12/2010 | Mu et al. |
| 2010/0312645 A1 | 12/2010 | Niejadlik |
| 2010/0312678 A1 | 12/2010 | Davis |
| 2011/0010292 A1 | 1/2011 | Giordano et al. |
| 2011/0022484 A1 | 1/2011 | Smith et al. |
| 2011/0035240 A1 | 2/2011 | Joao |
| 2011/0035264 A1 | 2/2011 | Zaloom |
| 2011/0035302 A1 | 2/2011 | Martell et al. |
| 2011/0065418 A1 | 3/2011 | Ryu et al. |
| 2011/0071922 A1 | 3/2011 | Hirson et al. |
| 2011/0072039 A1 | 3/2011 | Tayloe |
| 2011/0078077 A1 | 3/2011 | Hirson |
| 2011/0082767 A1 | 4/2011 | Ryu et al. |
| 2011/0082772 A1 | 4/2011 | Hirson |
| 2011/0125610 A1 | 5/2011 | Goodsall et al. |
| 2011/0131106 A1 | 6/2011 | Eberstadt et al. |
| 2011/0143710 A1 | 6/2011 | Hirson |
| 2011/0143711 A1 | 6/2011 | Hirson |
| 2011/0287748 A1 | 11/2011 | Angel et al. |
| 2011/0295750 A1 | 12/2011 | Rammal |
| 2011/0320291 A1 | 12/2011 | Coon |
| 2012/0036018 A1 | 2/2012 | Feliciano et al. |
| 2012/0171990 A1 | 7/2012 | Williams et al. |

FOREIGN PATENT DOCUMENTS

| | | |
|---|---|---|
| JP | 2007179383 | 7/2007 |
| KR | 20000036574 | 7/2000 |
| KR | 20030030684 | 4/2003 |
| KR | 20060103797 | 10/2006 |
| KR | 20070051817 | 5/2007 |
| KR | 20070103650 | 10/2007 |
| KR | 20080011338 | 2/2008 |
| WO | 9738538 | 10/1997 |
| WO | WO-2007004792 | 1/2007 |
| WO | WO-2007084593 | 7/2007 |
| WO | 2007102648 | 9/2007 |
| WO | 2007127521 | 11/2007 |
| WO | 2009/036511 | 3/2009 |
| WO | 2009044396 | 4/2009 |

OTHER PUBLICATIONS

International Application No. PCT/US2011/051094, International Search Report and Written Opinion Dec. 23, 2011.
International Application No. PCT/US12/25195, International Filing Date Feb. 15, 2012, International Search Report and Written Opinion, Apr. 26, 2012.
International Preliminary Report on Patentability, International Application No. PCT/US12/25195, filed Feb. 15, 2012.
Ching, Andrew T. et al., "Payment card rewards programs and consumer payment choice", Journal of Banking & Finance, vol. 34, Issue 8, http://dx.doi.org/10.1016/j.jbankfin.2010.03.015. (http://www.sciencedirect.com/science/article/pii/S0378426610001196), ISSN 0378-4266, Aug. 2010, pp. 1773-1787.
Garry, Michael , "Ending the paper chase", Progressive Grocer, May 1994.
National Consumers League, "Mobile commerce: what's all the buzz?", http://www.nclnet.org/personal-finane/60-mobile-commerce/314-mobile-commerce-what . . . , Mar. 3, 2007.
Verizon, , "Ring Tones & Ringback Tones—Terms and Conditions", http://support.verizonwireless.com/terms/products/ringtones_ringbacktones.html, May 6, 2009.

(56) References Cited

OTHER PUBLICATIONS

European Patent Application No. 09711520.8, Extended Search Report mailed Apr. 27, 2011.
International Application No. PCT/US2010/050616, International Search Report and Written Opinion, Apr. 26, 2011.
References International Application No. PCT/US2011/30039, International Search Report and Written Opinion, May 23, 2011.
International Application No. PCT/US2011/30038, International Search Report and Written Opinion, May 25, 2011.
Onebip S.R.L, "OneBip—to Pay Online: with Your Mobile Phone", Youtube online video at http://www.youtube.com/watch?v=RiEsMcc0tJY, May 23, 2007.
Arrington, Michael, "Mobile Payments Getting Traction on Social Networks but Fees are Sky High", Tech Crunch, located a http://techcrunch.com/2009/01/13mobile-payments-getting-traction-on-social-networks-but-fees-are-sky-high/,, Jan. 13, 2009.
Brooks, Rod, "MobilCash:Worlds First in Mobile Payments", YouTube online video located at http://youtube.com/wacth?v—j6Xv35gSmbg,, Oct. 12, 2007.
Bruene, Jim, "PayPal Launches on Facebook: Who Wants to be the First Bank?", located at http://www.netbanker.com/2007/06paypal_launches_on_facebook_who_wants_to_be_the_first_bank_on_facebook.hml., Jun. 22, 2007.
Chen, Will, "Gift Shop Credits Have Arrived", The Facebook Blog, located at gttp://blog.facebook.com/blog.php?post=36577782130, Oct. 31, 2008.
Federal Trade Commission, , "Children's Online Privacy Protection Act (COPPA)", 15 U.S.C. §§ 6501-6506, Oct. 21, 1998.
Ihlwan, Moon, "In Korea, Cell Phones Get a New Charge", http://businessweek.com/globalbiz/content/mar2006/gb20060301_260288.htm, Mar. 1, 2006.
Lee, Jessica, "Payment Industry Perspectives: O&A with Zang CEO David Marcus", http://www.insidefacebook.com/2009/05/19payment-industry-perspectives-qa-with-zong-ceo-david-marcus/, May 19, 2009.
Nicole, Kirsten, "Pay me Lets You Send and Receive Money Throuoh Facebook", http://mashable.com/2007/06/17pay-me-facebook-app, Jun. 17, 2007.
Paypal, Inc, , "Get What You Want: When You Want It", located at https://www.paypal.com/cgi-bin/webscr?cmd=xpt/ Marketing/mobile/MobileBuyStuff-outside, available at least by Mar. 5, 2009.
Zong, Inc., , "Virtual Goods/Currency and Mobile Payments: The Business Model for Social Apps", The Zong Blog at http://blog-zong.com/2008/10/25/virtual-goods-currency-and-mobile-payments-the business-model-for-social-apps/, Oct. 28, 2008.
Zong, Inc., , "Zong Mobile Payment Demo on a Facebook App", You Tube online video at http://www.youtube.com/watch?v=aLjRcAFrGil, Jan. 5, 2009.
Zong, Inc., , "Zong—Mobile Payments for Your Web App", You tube online video at http://www.youtube.com/watch?v=O2C3SQraAvQ, Sep. 5, 2008.
Zong, Inc., , "Zong Mobile Payments in Smallworlds", You Tube online video at htttp://www.youtube.com/watch?v=Y6CEw3tSgBc, Feb. 10, 2009.
International Application No. PCT/US11/22419, International Search Report and Written Opinion, Mar. 29, 2011.
International Application No. PCT/US11/22426, International Search Report and Written Opinion, Mar. 28, 2011.
Amazon.com, Inc., "Get Gold Box Deals Every Day with Amazon Text Alerts," located at http://www.amazon.com/gp/anywhere/sms/goldbox, available at least by Jun. 10, 2009.
Aradiom Inc., "The Real Solution—Aradiom SolidPass", located at http://www.aradiom.com/SolidPass/2fa-OTP-security-token.htm, available at least by Apr. 24, 2009.
Chua, Lye Heng, "How Customers Applied Java CAPS?" Sun Microsystems, Inc. presentation, Nov. 6, 2007.
Hassinen, Marko et al., "An Open, PKI-Based Mobile Payment System," Emerging Trends in Information and Communication Security, Lecture Notes in Computer Science, vol. 3995/2006, pp. 86-89, Jun. 1, 2006.
International Application No. PCT/US10/24525, International Search Report and Written Opinion, May 17, 2010.
International Application No. PCT/US10/57472, International Search Report and Written Opinion, Jan. 18, 2011.
International Application No. PCT/US10/59295, International Search Report and Written Opinion, Feb. 1, 2011.
International Application No. PCT/US10/59466, International Search Report and Written Opinion, Feb. 1, 2011.
International Application No. PCT/US2009/033823, International Search Report and Written Opinion, Sep. 24, 2009.
International Application No. PCT/US2009/039723, International Search Report and Written Opinion, Oct. 30, 2009.
International Application No. PCT/US2010/020189, International Search Report and Written Opinion, Dec. 10, 2010.
International Application No. PCT/US2010/021054, International Search Report and Written Opinion, Jul. 29, 2010.
International Application No. PCT/US2010/024535, International Search Report and Written Opinion, May 25, 2010.
International Application No. PCT/US2010/030338, International Search Report & Written Opinion, Jun. 3, 2010.
International Application No. PCT/US2010/032668, International Search Report and Written Opinion, Jul. 1, 2010.
International Application No. PCT/US2010/036940, International Search Report and Written Opinion, Jul. 21, 2010.
International Application No. PCT/US2010/037816, International Search Report and Written Opinion, Aug. 5, 2010.
International Application No. PCT/US2010/042703, International Search Report and Written Opinion, Sep. 13, 2010.
International Application No. PCT/US2010/046266, International Search Report and Written Opinion, Oct. 20, 2010.
Mobilians Co. Ltd., company website located at http://www.mobilians.co.kr/english/, available at least by Jan. 12, 2009.
PayPal, Inc., "Get What You Want, When You Want It," located at https://www.paypal.com/cgi-bin/webscr?cmd=xpt/Marketing/mobile/MobileBuyStuff-outside, available at least by Mar. 5, 2009.
PayPal, Inc., "Texting with PayPal—Easy as Lifting a Finger," located at https://www.paypal.com/cgi-bin/webscr?cmd=xpt/Marketing/mobile/MobileAdvancedFeatures-outside, available at least by Mar. 5, 2009.
Squidoo, LLC, "Introducing MobillCash: Make a Secure Sale Even When an Online Customer Has No Cash, Credit Cards or I.D.," located at http://www.squidoo.com/mobillcash-pay-by-mobile-phone, available at least by Aug. 29, 2008.
Sun Microsystems Inc., "The Road to Mobile Banking," white paper, Jun. 2008.
Tindal, Suzanne, "St. George Counts Down to Two-Factor Authentication," ZDNet Australia, Feb. 19, 2008.
Trusted Mobile Payment Framework, "Scheme Rules," version 2.0, Aug. 6, 2008.
VISUALtron Software Corporation, "2-Factor Authentication—What is MobileKey?" located at http://www.visualtron.com/products_mobilekey.htm, available at least by 2008.
Wikimedia Foundation, Inc., "Authentication," located at en.wikipedia.org/wiki/Authentication, Mar. 17, 2009.
Wikimedia Foundation, Inc., "Credit Card," located at en/wikipedia.org/wiki/Credit_card, Dec. 5, 2008.
Wikimedia Foundation, Inc., "Security Token," located at en.wikipedia.org/wiki/Security_token, Apr. 13, 2009.
Wikimedia Foundation, Inc., "Two-Factor Authentication," located at en.wikipedia.org/wiki/Two-factor_authentication, Apr. 24, 2009.
Zabawskyj, Bohdan, "In the Media: The Mobile Money Opportunity," Billing World and OSS Today, located at http://www.redknee.com/news_events/in_the_media/43/?PHPSESSID=1e0ca1ab057bf9dc2c88104877ca8010, Sep. 2007.

\* cited by examiner

| 1501 | 1502 | 1503 | 1504 | 1505 | 1506 | 1507 | 1508 |
|---|---|---|---|---|---|---|---|
| ID | PHONE | GN | FN | GENDER | CITY | ENTERTAIN-MENT | HOBBY |
| 001 | [P1] | [GN1] | [FN1] | M | [C1] | [E1] | [H1] |
| 002 | [P2] | [GN2] | [FN2] | F | [C2] | [E2] | [H2] |
| 003 | [P3] | [GN3] | [FN3] | F | [C3] | [E3] | [H3] |
| 004 | [P4] | [GN4] | [FN4] | M | [C4] | [E4] | [H4] |
| 005 | [P5] | [GN5] | [FN5] | M | [C5] | [E5] | [H5] |
| 006 | [P6] | [GN6] | [FN6] | M | [C6] | [E6] | [H6] |
| 007 | [P7] | [GN7] | [FN7] | F | [C7] | [E7] | [H7] |
| 008 | [P8] | [GN8] | [FN8] | F | [C8] | [E8] | [H8] |
| 009 | [P9] | [GN9] | [FN9] | F | [C9] | [E9] | [H9] |
| 010 | [P10] | [GN10] | [FN10] | M | [C10] | [E10] | [H10] |

Fig. 15

| 1702 | 1703 | 1704 | 1705 | 1706 | 1707 |
|------|------|------|------|------|------|
| ID | SUPPLIER | PRODUCT | NET PRICE | DISCOUNT | ACTUAL PAID |
| 0101 | JONES | [P1] | [NP1] | [D1] | [AP1] |
| 4781 | SMITH | [P2] | [NP2] | [D2] | [AP2] |
| 3211 | BROWN | [P3] | [NP3] | [D3] | [AP3] |
| 4781 | JONES | [P4] | [NP4] | [D4] | [AP4] |
| 4781 | BIG INC | [P5] | [NP5] | [D5] | [AP5] |
| 1049 | BIGGER INC | [P6] | [NP6] | [D6] | [AP6] |
| 0976 | SMITH | [P7] | [NP7] | [D7] | [AP7] |

CUSTOMER TO SUPPLIER FUNDS TRANSFER

RELATED APPLICATIONS

This is a continuation of prior U.S. patent application Ser. No. 12/413,474, filed on Mar. 27, 2009, which claims priority to United Kingdom Patent Application Number 08 09 383.3, filed on May 23, 2008 and entitled "Customer to Supplier Funds Transfer," all of which are incorporated herein by reference.

FIELD OF THE TECHNOLOGY

At least some embodiments of the disclosure relate to apparatuses for performing customer to supplier funds transfer.

BACKGROUND

Systems for ordering products and/or services over the Internet and then making payment via the Internet are known. Many of these conventional systems involve identifying credit or debit card numbers such that funds may be obtained from a bank in a manner substantially similar to conventional credit card transactions.

A system for instructing payment to be made via mobile telephone text messages is described in United States patent application publication No. 2007/0203836 A1, published Aug. 30, 2007. This provides an alternative method of payment that may be considered more secure than entering credit card details into a networked computer system, but it has a disadvantage in that it requires a set up procedure in order for the method to be deployed.

An alternative approach is described in United States patent application publication number 2009/0006217 A1, published Jan. 1, 2009, which was filed Jun. 29, 2007 and assigned U.S. patent application Ser. No. 11/824,607. This process has been successfully deployed and is trading under the service mark "MOBILLCASH." The MOBILLCASH system allows an order to be placed over the Internet and for funds to be transferred by transmitting a plurality of premium rate mobile terminating text messages to a mobile telephone held by the customer. Thus, by this method, a customer is only required to enter their telephone number, resulting in a charge being made to their mobile telephone account, from which it is then possible for funds to be transferred to the supplier.

However, a problem with effecting transfers using mobile telephone technology is that charges for using the service tend to be grouped together with other mobile telephony charges, and therefore a user may be persuaded to revert back to using a credit card so as to identify these charges separately.

SUMMARY OF THE DESCRIPTION

Apparatuses and methods to facilitate customer to supplier funds transfer via premium messages are described herein. Some embodiments are summarized in this section.

In one aspect, there is provided a system for the electronic transfer of funds from a customer to a supplier, including: a customer browser component connected to a network; a supplier browser component connected to the network; a server component connected to the network and having a database component; a mobile cellular telephone with a telephone number operable by the customer; a mobile cellular operator providing mobile cellular services to the mobile cellular telephone; wherein: the server component is configured to transmit a plurality of premium rate mobile terminating text messages to the mobile cellular telephone to effect a payment from the customer to the supplier after a customer has placed an order with a supplier; the server component is configured to populate the database with an identification of each the customer's telephone number; the server component is configured to populate the database with respect to each transaction implemented by the transmission of the premium rate text messages; and the server is configured to facilitate the accessing of transaction records for a requesting customer by receiving details of the customer's telephone number.

In a preferred embodiment, the server is configured to facilitate the accessing of transaction records from a requesting customer only after the customer has supplied personal details and become a registered user.

In a second aspect, there is provided a method for providing customer to supplier funds transfer, including: transmitting a plurality of premium rate mobile terminating text messages to a mobile cellular telephone to effect a payment from a customer to a supplier after the customer has placed an order with the supplier; populating a database at the server with an indication of each customer's telephone number; populating the database with respect to each transaction implemented by the transmission of the premium rate text messages; and facilitating the accessing of transmission records from a requesting customer by receiving details of the customer's telephone number.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 15 shows a database table for recording information.

FIG. 17 details a table in database 208.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Figure 1:
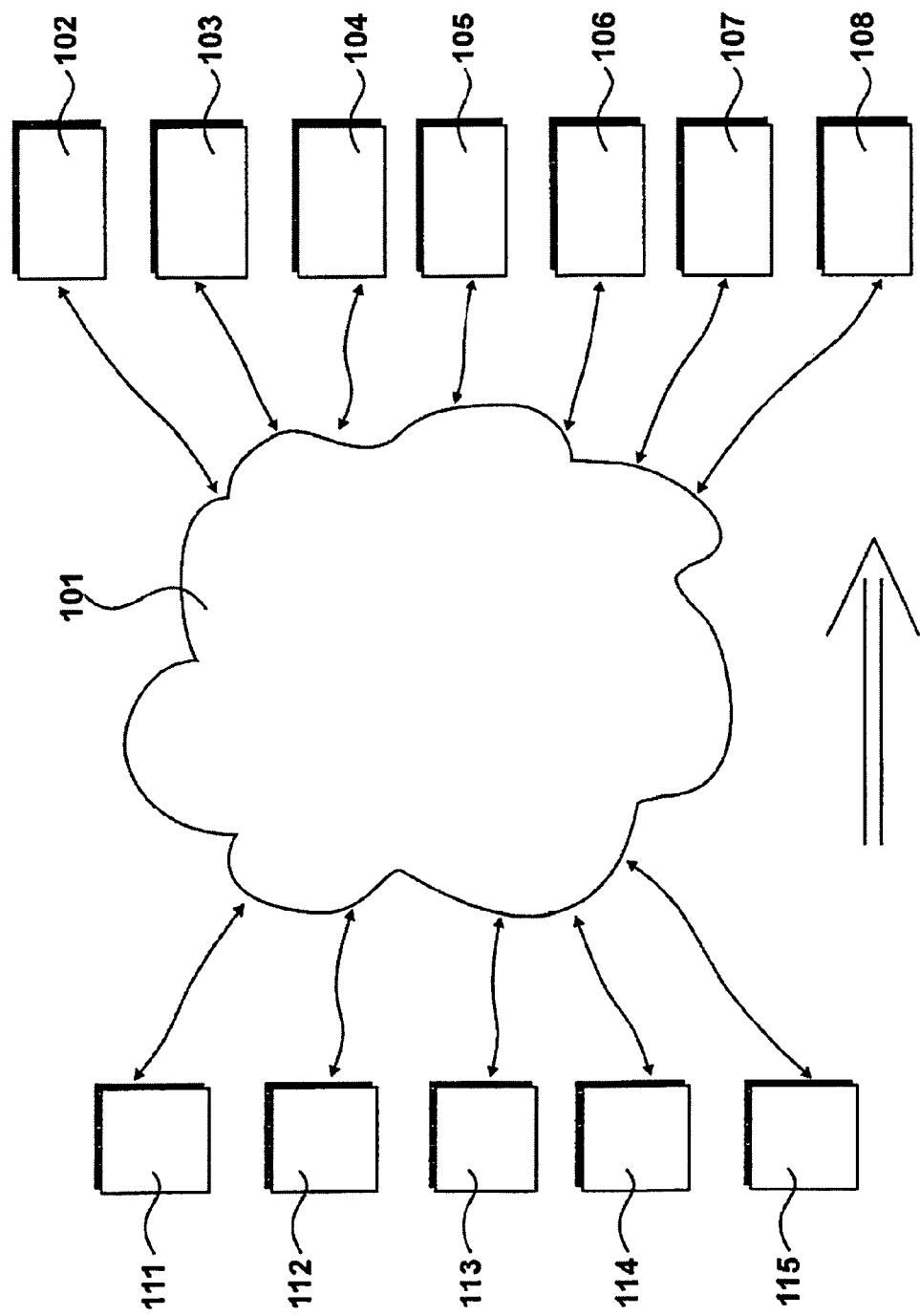
FIG. 1 shows a representation of the Internet.

A representation of the Internet 101 is illustrated in FIG. 1 in which potential customers are provided with customer browsers 101 to 108 and a plurality of suppliers are provided with supplier browsers 111 to 115. The environment therefore allows customers to place orders with suppliers for the delivery of products and/or services and for the customers to transfer funds to the suppliers in order to effect payment for the goods and/or services.

It is known practice for a transaction to be initiated by a customer, such as customer 102, by the customer making a request for a web page to be served, which provides details of a supplier's products, allows product selections to be made and facilitates payment for these products.

Figure 2:
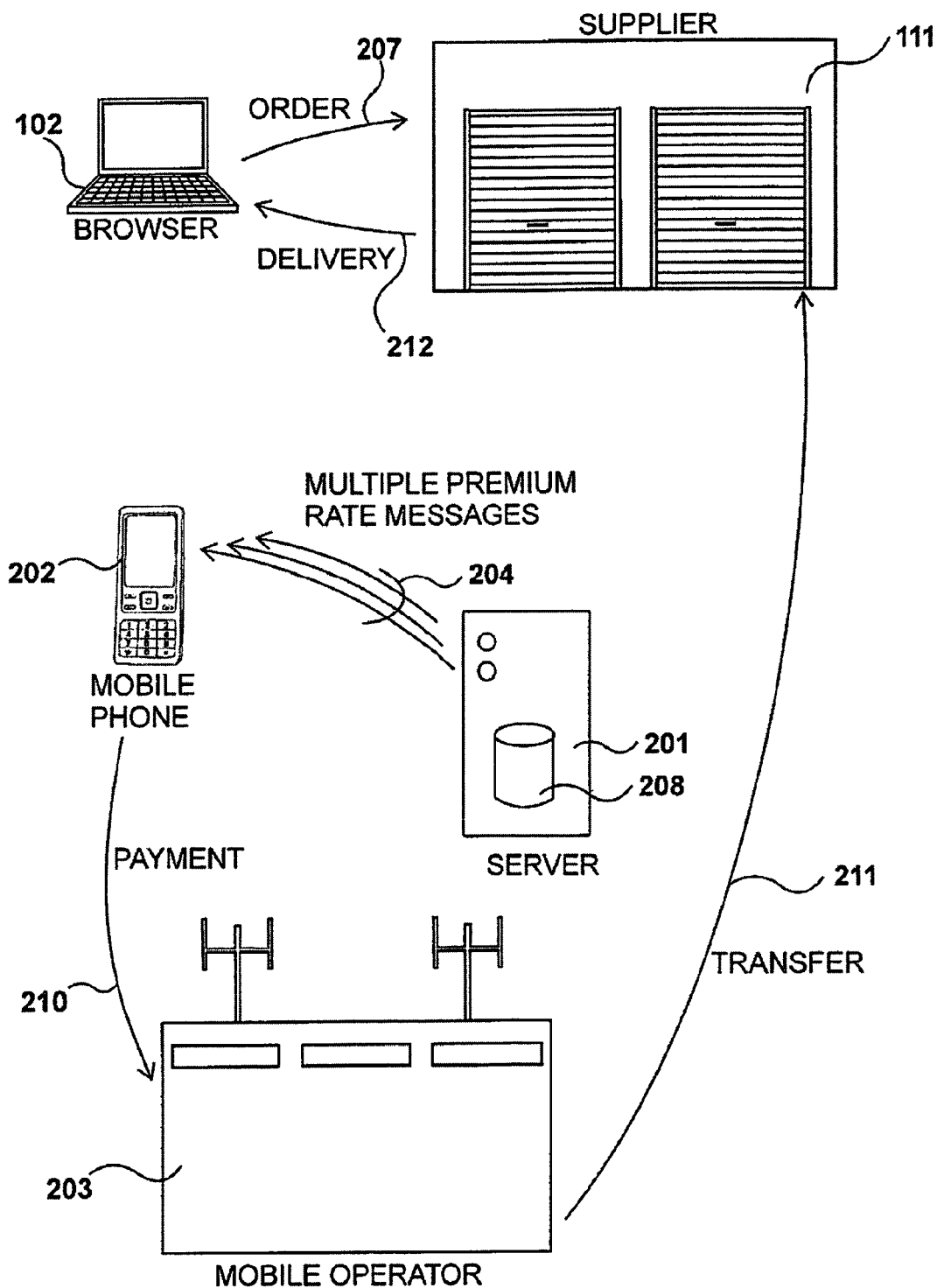
FIG. 2 shows components forming a preferred embodiment working within the environment of FIG. 1 conducted within the environment of FIG. 2.

FIG. 2 shows components forming a preferred embodiment working within the environment of FIG. 1 conducted within the environment of FIG. 2.

Within the environment identified in FIG. 1, a preferred aspect of one embodiment provides an apparatus for the electronic transfer of funds from a customer to a supplier as illustrated in FIG. 2. A customer browser component 102 is connected to the Internet 101 and a supplier server component 111 is also connected to the Internet. A service server component 201 is connected to the Internet 101 and a mobile cellular telephone 202 is operable by the customer, that is to say, the same customer who is using browser 102.

A mobile cellular operator 203 provides mobile cellular services to the mobile cellular telephone 202. The service server component 201 is configured to transmit a plurality of premium rate mobile terminating text messages 204 to the mobile cellular telephone to effect a payment from the customer (at 102) to the supplier (at 111) after the customer has placed an order with the supplier.

The mobile terminating premium rate messages are included in telephone bills received by the mobile telephone owner, resulting in payment 210 being made to the mobile operator 203. Thereafter, the mobile operator 203 effects the appropriate transfer 211 to the supplier 111. The supplier 111 has now received funds and is therefore prompted to perform delivery 212 of the purchased product or service.

Figure 3:
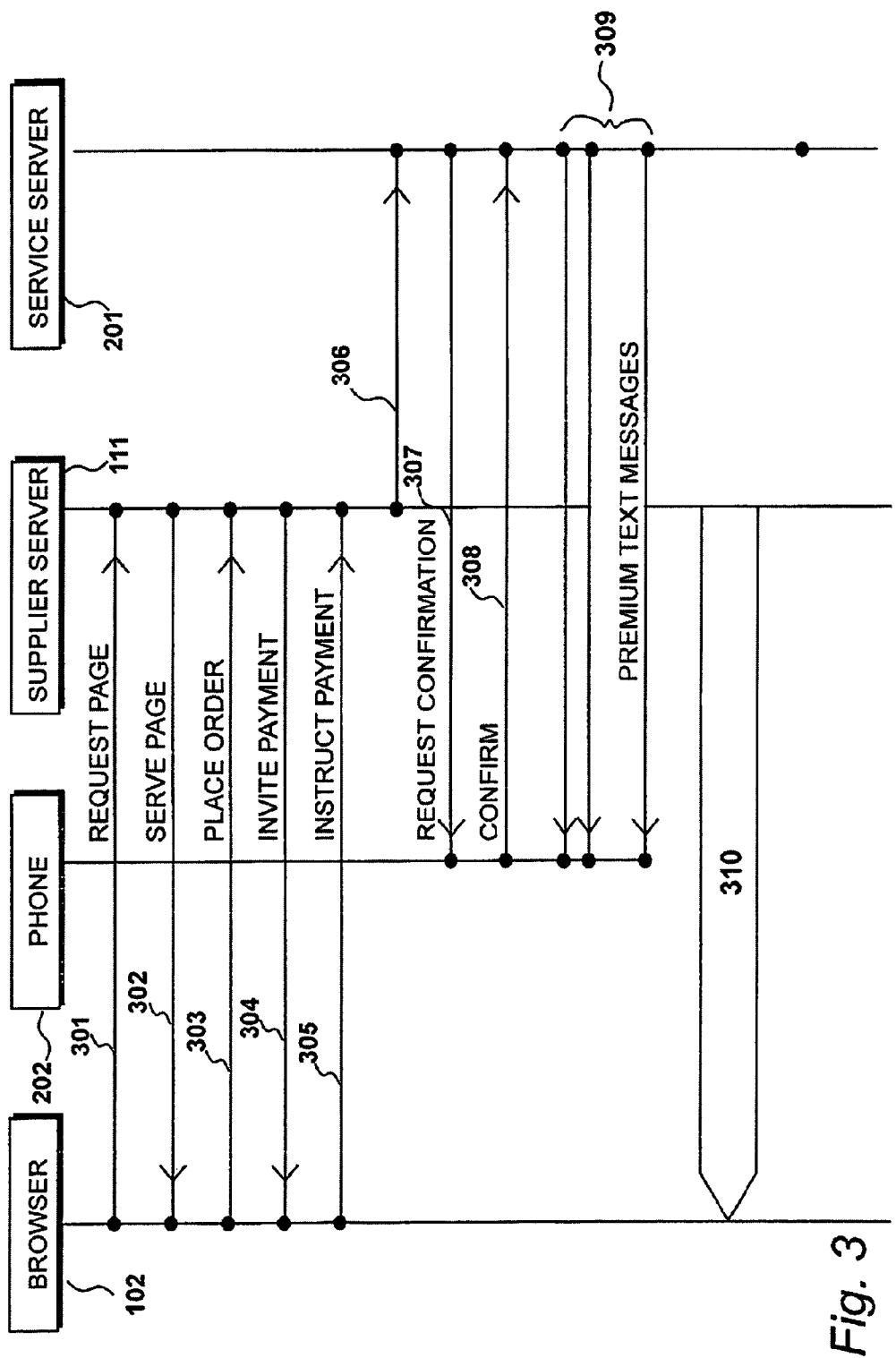
FIG. 3 shows procedures conducted within the environment of FIG. 2.

Procedures conducted within the environment of FIG. 2 are detailed in FIG. 3, in the form of a telecommunications protocol diagram. The diagram of FIG. 3 includes the browser 102, the cellular telephone 202, the supplier server 111 and the service server 201.

Initially, the browser issues a signal 301 to request a page to be supplied from the supplier server 111. In response to receiving this request, a page of data 302 is returned to the browser 102, resulting in a page being displayed to the customer at the browser 102.

In response to reviewing the served page, a request 303 for an order is conveyed to the supplier server 111. In response to receiving this order, the product server 111 makes an invitation 304 for a payment to be made. In response to receiving an invitation for a payment to be made, the browser makes an instruction 305 in order to effect the payment. Thus, in accordance with one embodiment, payment is made by issuing premium rate text messages to the mobile telephone.

The supplier server 111 issues an instruction 306 to the service server 201. The service server 201 issues a request 307 to the mobile cellular telephone 202 for a confirmation to the effect that the payment is to be made. Thus, in order to achieve payment by the mobile telephone mechanism, it is necessary to enter a telephone number and it is also necessary for the purchaser to be in possession of the mobile telephone so that the purchaser may effect that confirmation.

The mobile cellular telephone therefore issues a confirmation 308 back to the service server 201 (via the cellular telephone network) to the effect that the purchase has been confirmed.

Upon receiving the request confirmation 308, the service server schedules and issues a plurality of premium rate mobile terminating text messages 309. Thereafter, the product, virtual product or service is sent from the supplier to the purchaser, as illustrated by arrow 310.

Figure 4:
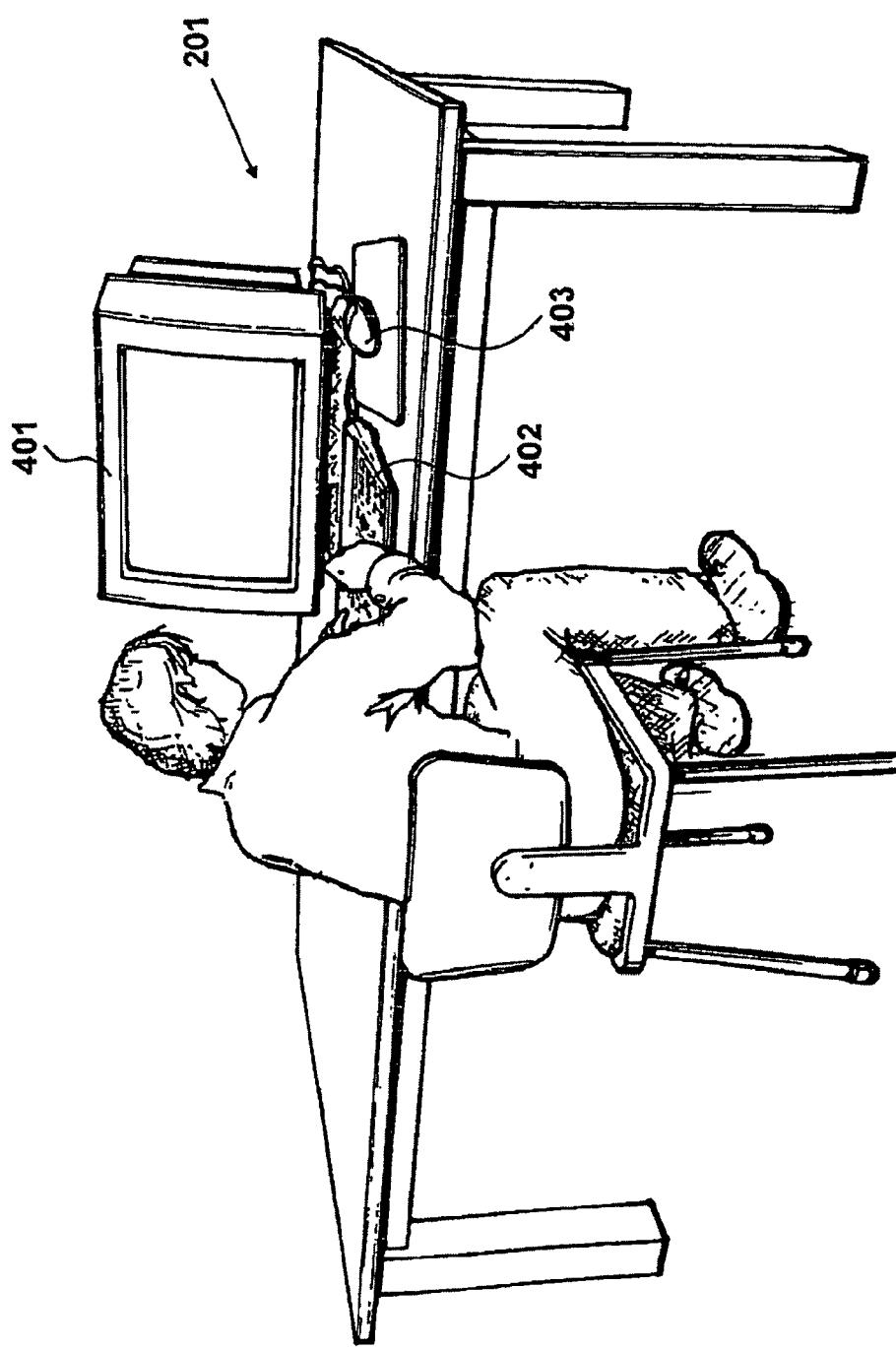
FIG. 4 shows an example of a browser.

An example of a browser 201 is illustrated in FIG. 4, in which a visual display unit 401 is provided to allow web pages to be displayed. In addition, user input is facilitated by a keyboard 402 and a mouse 403. The applicant has become aware that browser environments are particularly attractive for displaying catalogues of goods and receiving orders for goods. However, problems arise in terms of effecting payment over the Internet due to security concerns. The mobile telephone system described herein thereby provides an alternative mechanism for payment.

Generally, the relationship between customers and mobile providers is a strong relationship built on mutual trust. Within the Internet environment it is unlikely for this level of trust to exist. Furthermore, it is not necessary for the user to have access to a credit card or to even possess a credit card.

In the example shown in FIG. 4, the browser takes the form of a desktop computer but equally it could take the form of a laptop computer or similar device. It is also envisaged that the browser and mobile telephone text messaging services could be constrained within a unified product, such as a high level mobile device.

Figure 5:
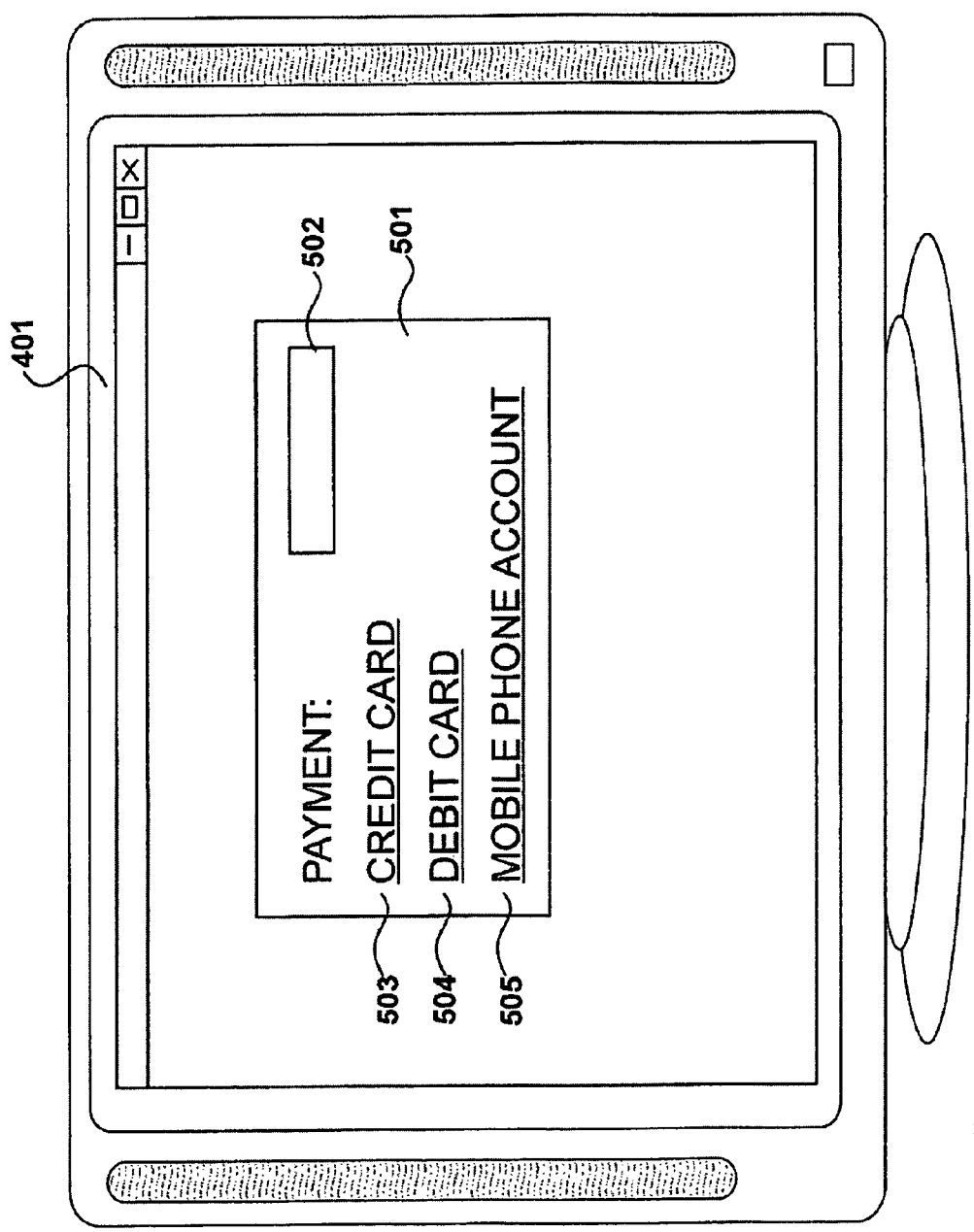
FIG. 5 details the visual display unit identified in FIG. 4.

FIG. 5 details the visual display unit 401 identified in FIG. 4. The visual display unit 401 in FIG. 5 shows an image relevant for initiating the process of making a payment. Display 501 includes a field 502 in which the current price is displayed. The user is then prompted to identify a means of payment, which in this example shows a credit card link 503, a debit card link 504 and the mobile telephone account link 505. In practice, many of these links may be repeated for different credit card types, for example, and often each credit card link would include its associated logo or graphical representation, etc.

Figure 6:
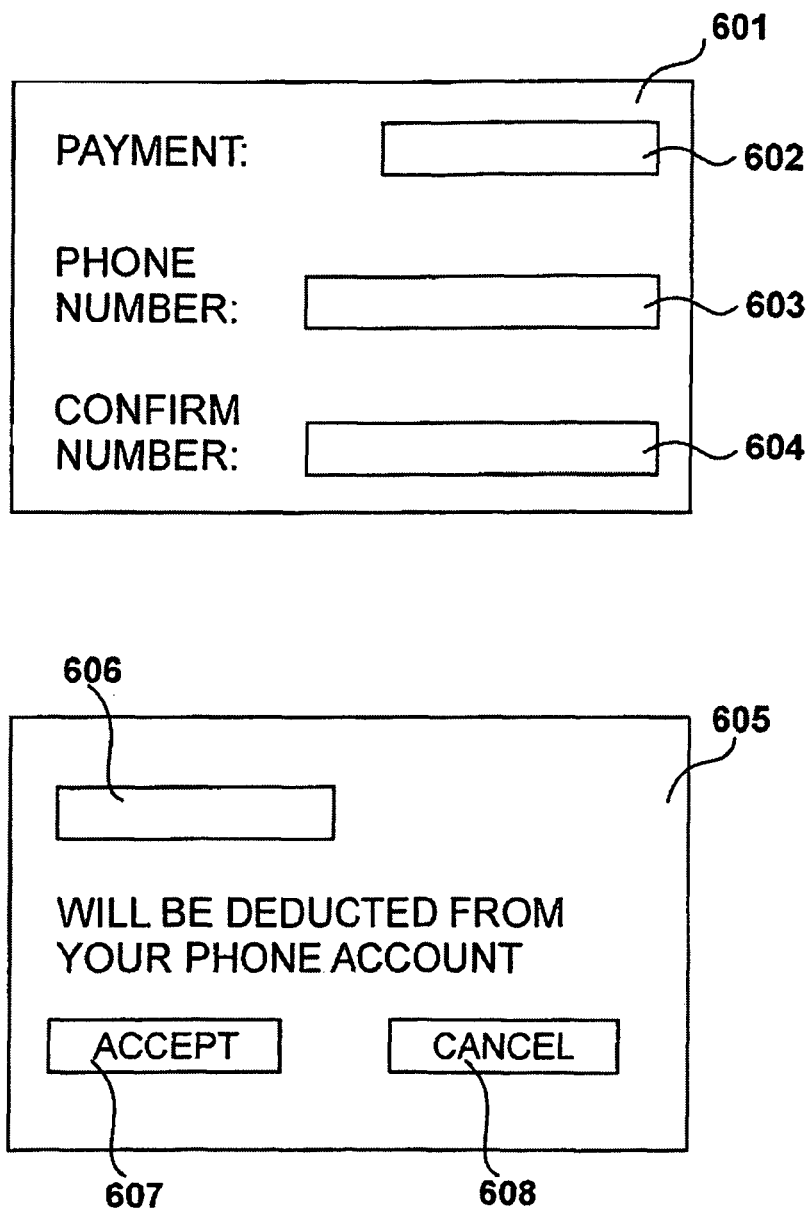
FIG. 6 details graphical user interfaces displayed by the visual display unit identified in FIG. 5.

FIG. 6 details graphical user interfaces displayed by the visual display unit identified in FIG. 5.

Having clicked through on link 505 (as shown in FIG. 5) screen 601 is displayed, that also includes a field 602 identifying the required payment. Having clicked through for this type of payment, it is possible that the total payment figure may have increased so as to include an additional charge for effecting payment via the mobile cellular telephone network. Thus, assuming a user wishes to continue, the user is invited to enter their cellular telephone number in a field 603 and the user may be asked to confirm this number in a further field 604. After confirming the payment, a further screen 605 may be displayed, subject to the particular implementation of the application.

Screen 605 includes a field 606 again identifying the total payment. The screen then continues to say that this amount will be deducted from the telephone account and a user is invited to accept the transaction by clicking button 607 or declining the transaction by clicking cancel button 608.

Figure 7:
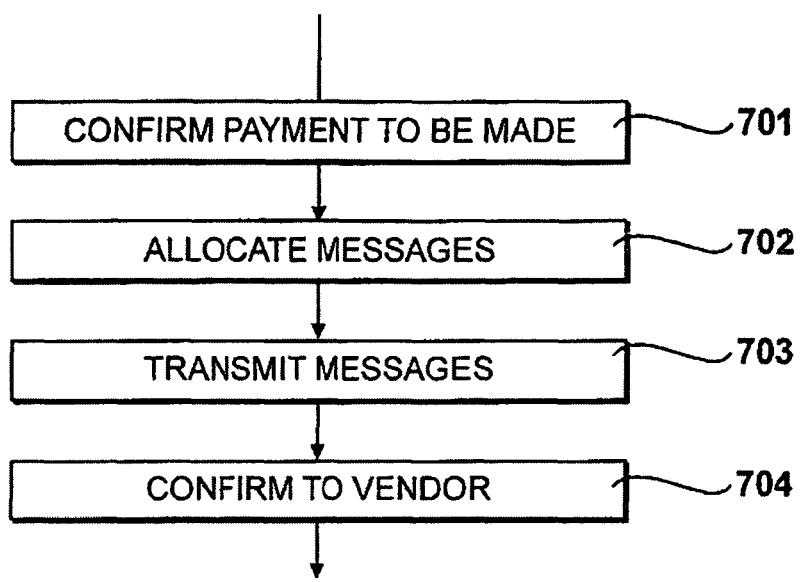
FIG. 7 shows procedures implemented by a service server.

Procedures implemented by the service server 201 are identified in FIG. 7. The service server provides for the operating of a payment via the Internet in which details are received, of a transaction, from a product server 111 identifying a price to be paid by the customer. Details of the customer's mobile telephone are received at the service server and thereafter a plurality of premium rate text messages are transmitted to the mobile telephone to effect that payment.

In response to receiving instructions 306, the service server 201 seeks confirmation from the mobile cellular telephone in operation 701 to the effect that payment is to be made.

Upon receiving confirmation 308, messages are allocated in operation 702, and in operation 703 the premium rate messages are transmitted with confirmation to the supplier being provided in operation 704.

Figure 8:
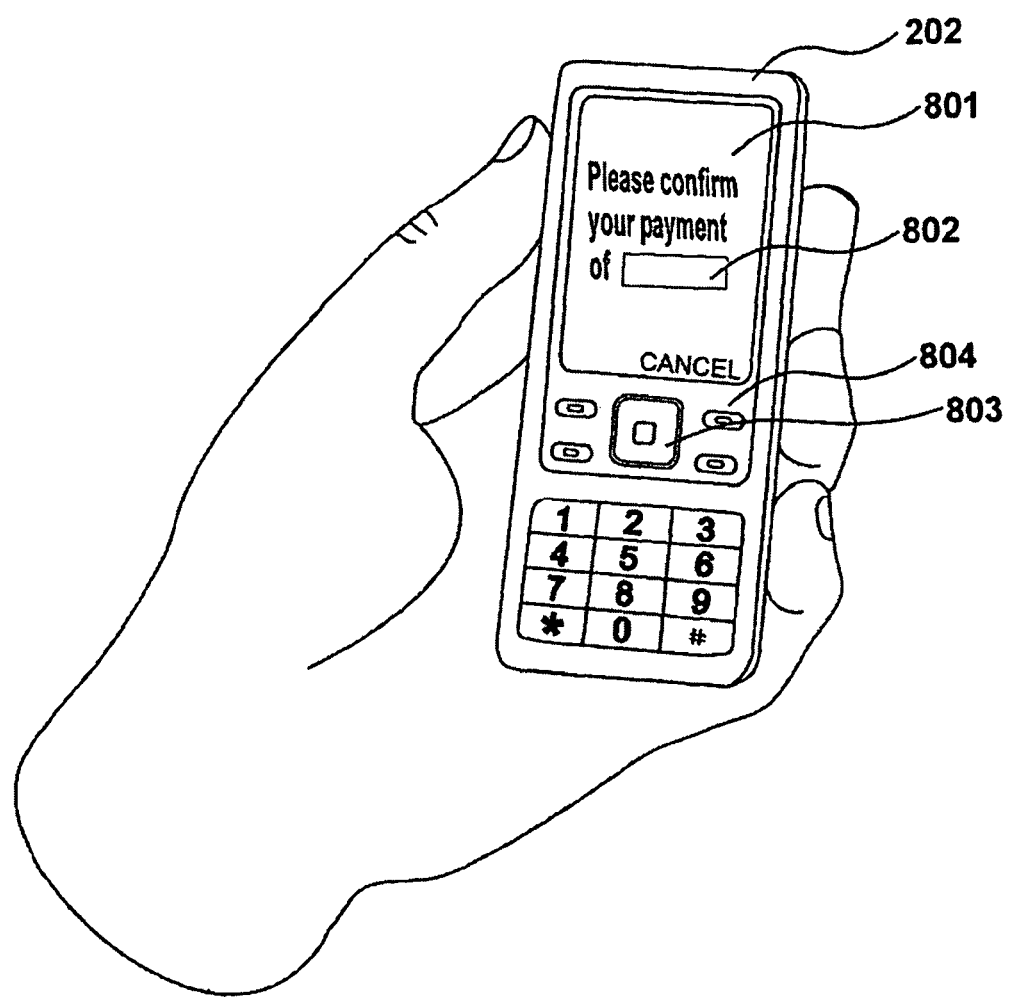
FIG. 8 details procedures for confirming a payment identified in FIG. 7.

FIG. 8 details procedures for confirming a payment identified in FIG. 7.

The result of procedure 701 for confirming the payment is illustrated in FIG. 8, in which the mobile cellular telephone 202 receives a message displayed on the mobile telephone display 801. In this example, the message states "please confirm your payment of" and the amount to be paid is displayed in field 802. In this example, it is possible to confirm the payment by operating the central navigation button 803. Alternatively, the transaction may be cancelled by the operation of a cancel button 804.

The confirmation of the payment creates a mobile originating message. This message may incur a modest charge for transmission over the mobile network. In this example, a dedicated mobile telephone is shown. However it should be appreciated that the mobile telephone designation also includes other devices with mobile telephony functionality.

Figure 9:
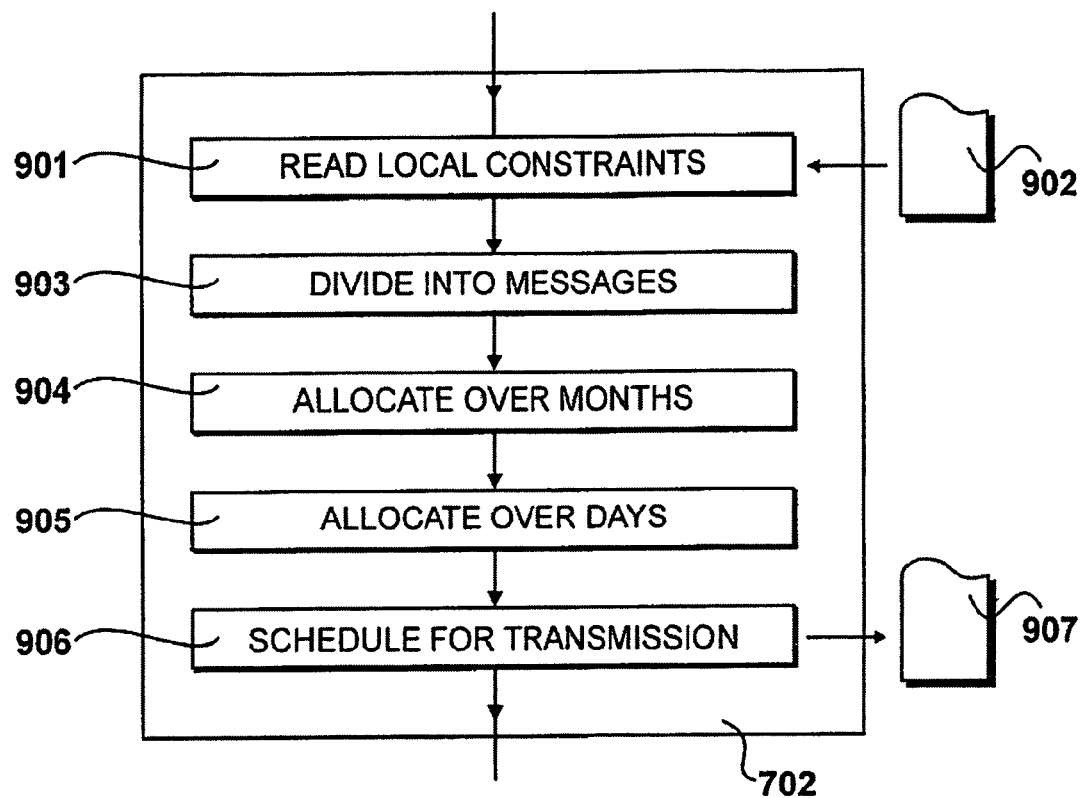
FIG. 9 details procedures for the allocation of messages identified in FIG. 7.

FIG. 9 details procedures for the allocation of messages identified in FIG. 7.

Procedure 702 for the allocation of messages is illustrated in FIG. 9. In operation 901 a file 902 of data is read that identifies appropriate local constraints for the transaction. Alternatively, these details may be supplied from an appropriately configured database. The local constraints are relevant for the particular country in which the financial transaction is taking place, including appropriate currency for the transaction and other regulations relating to the use of premium rate messages.

The constraints contained within file 902 identify the specific examples of premium rate messages that may be deployed, along with a level of payment that is associated with each of these messages. In addition, the constraints also specify maximum transaction values, usually restricting the total level of transactions that may occur during a day and often also identifying a maximum level of transactions that may take place over a month, given that many customers are billed on a monthly basis.

In this example, an operator may specify that total transactions for a day must not exceed 30 dollars and total transactions for the month must not exceed 400 dollars. Typically, these constraints are applied across an operator's network and are not allocated on a customer-by-customer basis.

In operation 903 the total value of the transaction is divided into a plurality of messages such that in combination, the value of the messages adds up to the total value of the transaction.

In operation 904 an allocation is made over a number of months. If the total value of the transaction exceeds a monthly limit, it is necessary to spread the transmission of the messages over two or more months.

In operation 905 an allocation is made over a number of days. Again, if either total transactions or monthly transactions exceed the total transactions allowed, the actual transmissions must take place over a number of days, with a plurality of messages being allocated for each individual day within the batch.

It is possible for the maximum transmissions to occur within, for example, three days over a particular month. It is possible that the transactions could occur over more days, until the allocation for the month is reached. If the allocation for the month is reached, it is then necessary to continue making transmissions upon entering the next month.

In operation 906 the transmissions are scheduled, resulting in the generation of a transmission schedule 907.

Figure 10:
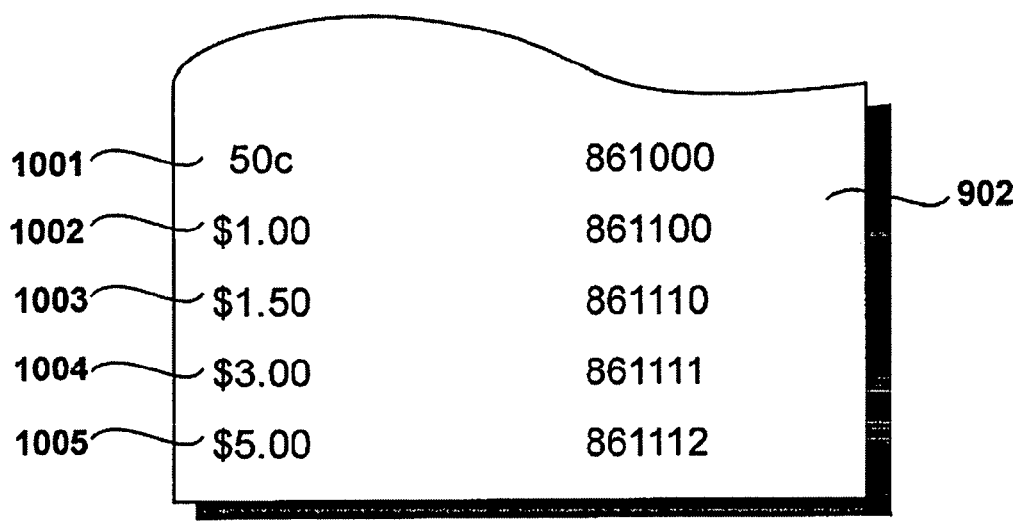
FIG. 10 shows an example of a constraints file of the type identified in FIG. 9.
Figure 10:
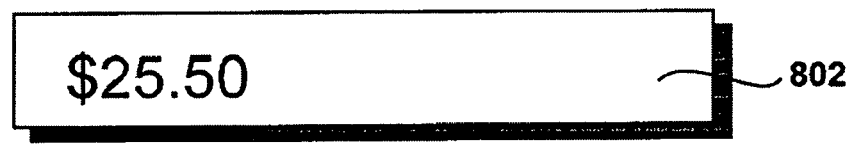
Figure 10:
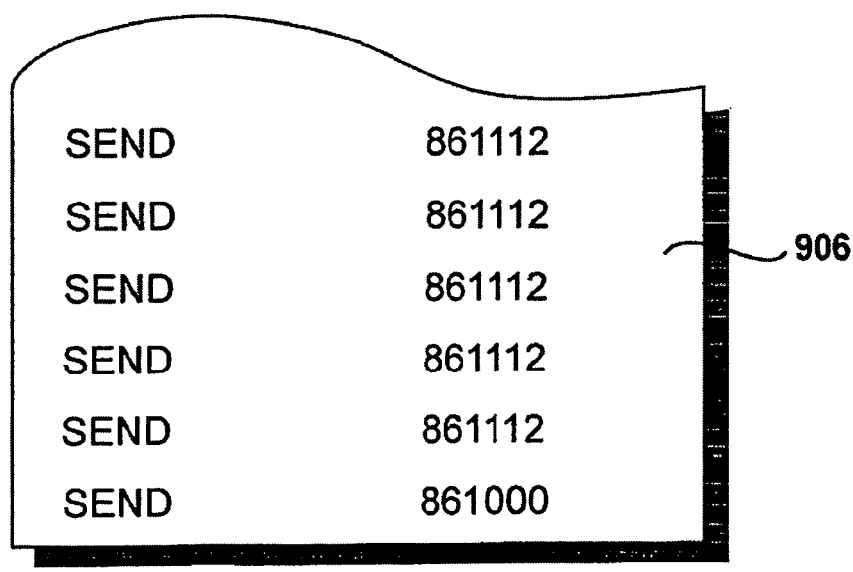

FIG. 10 shows an example of a constraints file 902 of the type identified in FIG. 9. This defines a total transmission value for the day and a total transmission value for the month. In addition, it identifies valid premium rate message codes. Thus, in this example, at line 1001 a code 861000 effects a charge of 50 cents, as shown at line 1002. Similarly, a code of 861100 effects a charge of 1 dollar and as illustrated at line 1003, a charge of 1.50 dollars is effected as a result of transmitting code 861110. A code of 861111 results in a charge of 3 dollars and similarly a five dollar charge results from the transmission of code 861112.

An example of a displayed field 802 is also shown in FIG. 10 which, for the purposes of this illustration, indicates a charge of 25.50 dollars.

Figure 11:
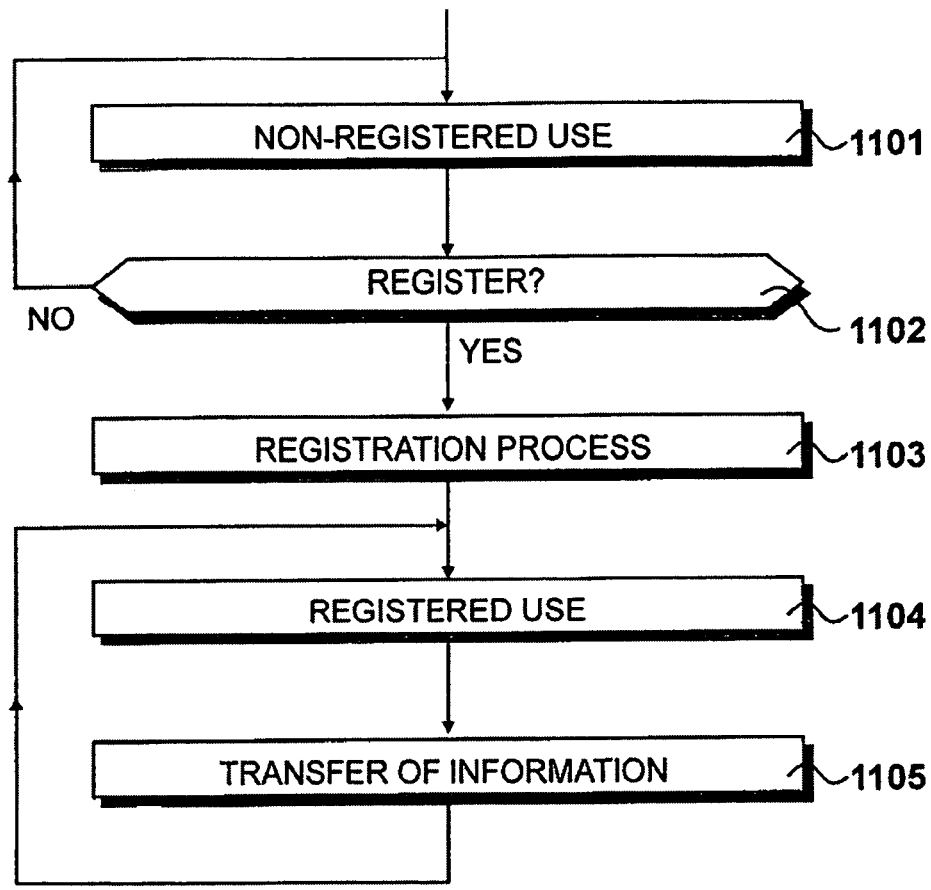
FIG. 11 shows various use types.

FIG. 11 shows various use types.

The present preferred apparatus performs a method of transferring funds electronically in which a plurality of premium rate mobile text messages are transmitted from the server to a mobile cellular telephone to effect payment from the customer to the supplier after the customer has placed an order with a supplier via a network connected browser. A database is populated at the server with an identification of each customer's telephone number. It is then possible for customers to make purchases via this mechanism in a nonregistered mode of operation. However, in accordance with a preferred aspect of one embodiment, the customer is prompted to supply additional personal data. Thus, as illustrated in FIG. 11, nonregistered use of the system is illustrated at 1101. After this nonregistered use, a question is asked at 1102 of a customer as to whether they wish to register their use of the system. Thus, when answered in the negative, further nonregistered use may occur at 1101.

If, however, the customer agrees to the registration process (the question asked in operation 1102 being answered in the affirmative), a registration process is performed in operation 1103.

Thereafter, registered use occurs in operation 1104, and thereafter in operation 1105, transaction information may be transferred to suppliers and third parties.

Figure 12:
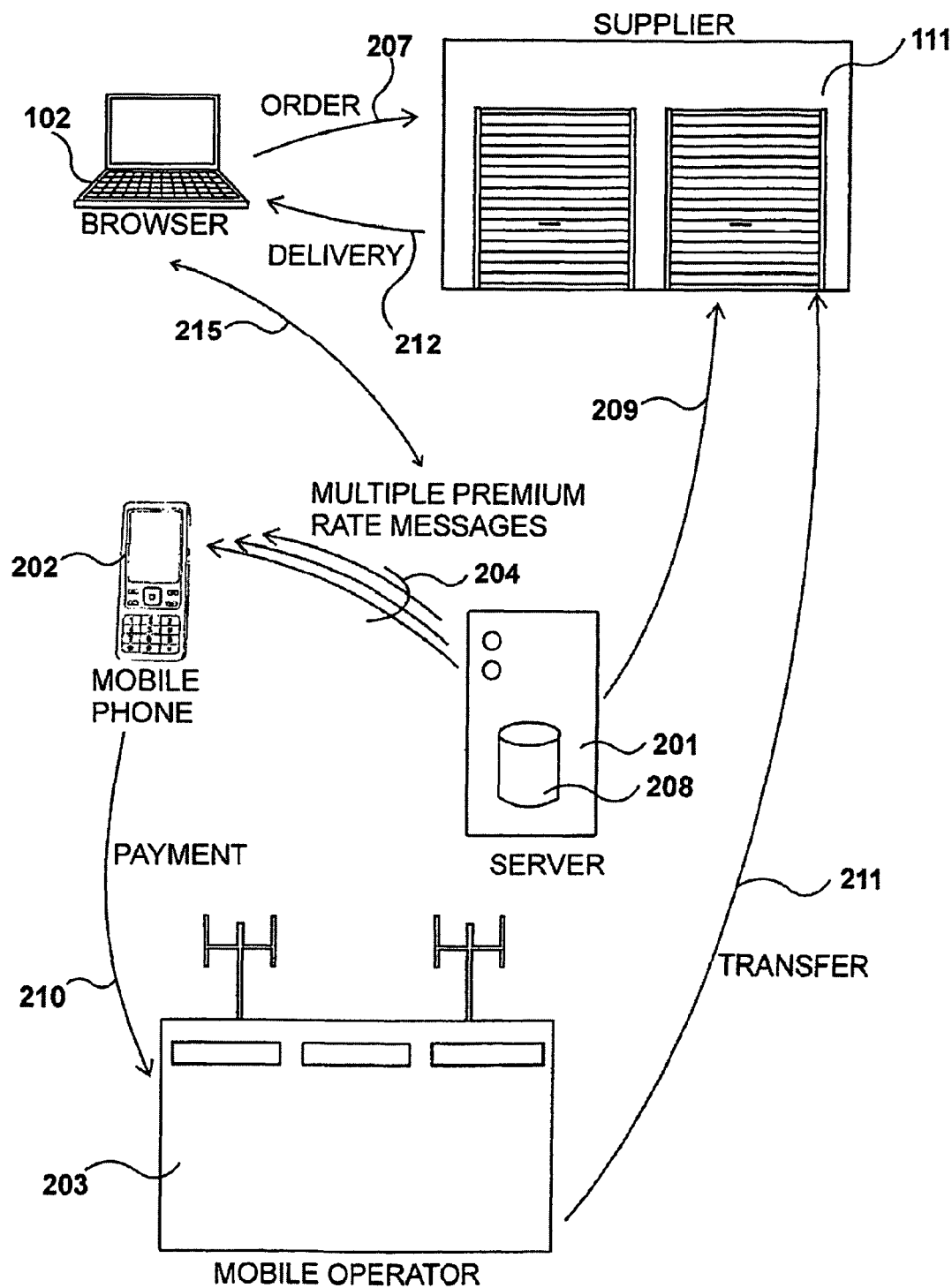
FIG. 12 shows an environment substantially similar to that of FIG. 2, implementing one embodiment.

FIG. 12 shows an environment substantially similar to that of FIG. 2, implementing one embodiment. Multiple premium rate mobile terminating text messages 204 are shown being issued from the server 201 to the mobile cellular telephone 202. However, in addition, the mobile cellular telephone 209 also receives an invitation or a prompt 215 to supply additional personal information.

Figure 13:
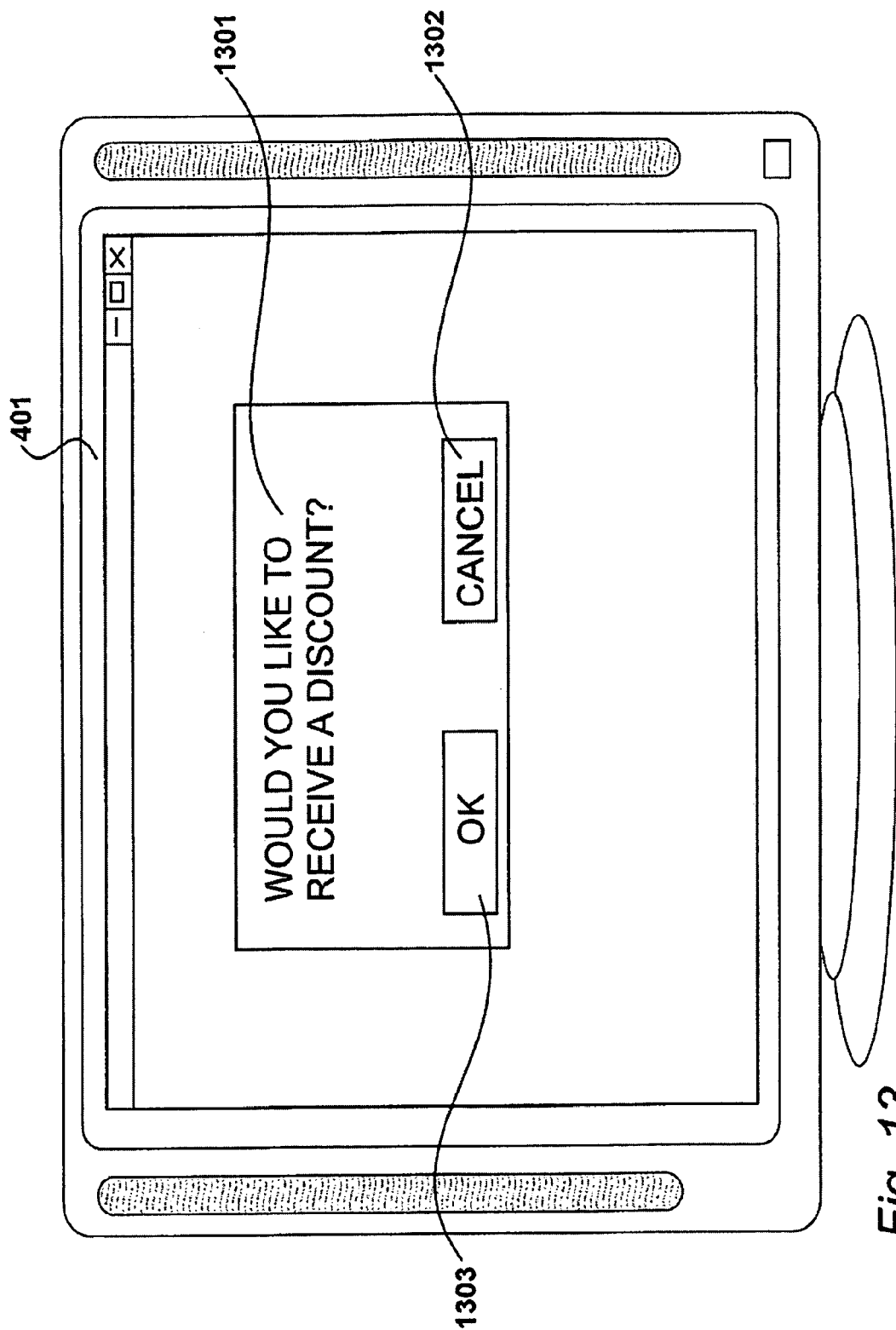
FIG. 13 shows an example of an invitation of the type identified in FIG. 12.

FIG. 13 shows an example of an invitation 215 of the type identified in FIG. 12. In the example of an invitation 215 to a browser illustrated in FIG. 13, the browser receives a message 1301 which states "would you like to receive a discount?" In response to receiving this, it is possible for the user to press a cancel button 1302. Alternatively, pressing an "OK" button 1303 results in an affirmative response being returned to the server 201.

Figure 14:
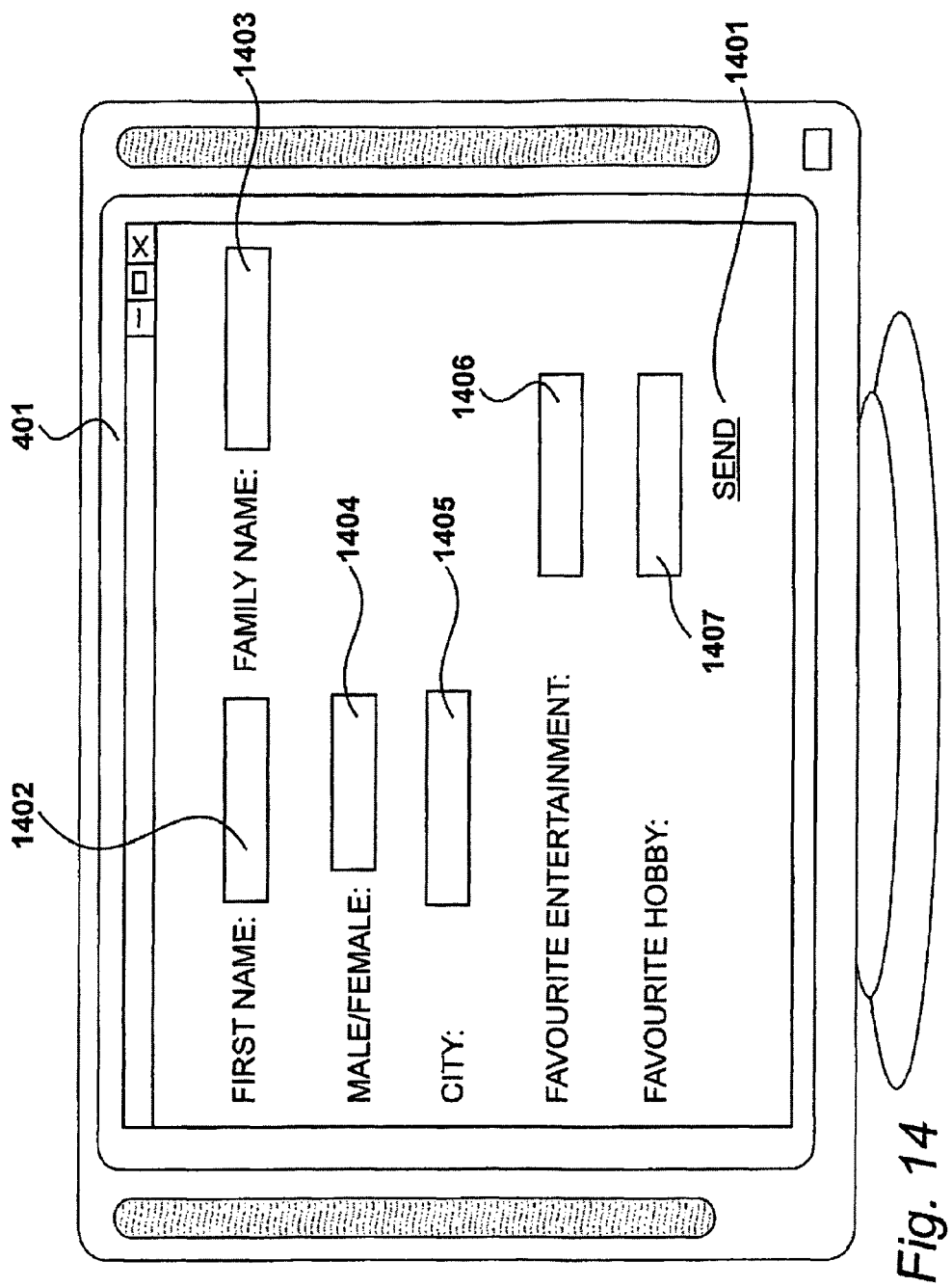
FIG. 14 shows a graphical user interface for receiving information.

FIG. 14 shows a graphical user interface for receiving information. In a preferred embodiment, personal information is received from the user via the user's browser 102.

When the user makes use of browser 102 to effect payment via this method again, the user is presented with a screen of the type shown in FIG. 14. At the browser, the user selects fields within the graphical user interface using mouse 403 and enters the text by keyboard 402. The user then applies a mouse click to the "send" link 1401.

In this example, a first name is received at field 1402 and a family name is received at field 1403. These are text boxes allowing any text entry to be made. Further fields 1404 to 1407 are provided in the form of pull down boxes from which predefined selections can be made. Thus, in field 1404 the user is invited to identify their gender and at field 1405 they are invited to identify their city of residence. Similarly, pull down box 1406 invites the user to identify a favorite entertainment and a similar pull down box at 1407 allows a favorite hobby to be identified within the field. As previously stated, the user then selects link 1401 and the information is transmitted over channel 215 to the database 208 within server 201.

FIG. 15 shows a database table for recording information. Within database 208 a table is created so as to record the information received from each user. At column 1501 a unique identification is given for the user which is then recorded against the user's telephone number at column 1502. For nonregistered use, only columns 1501 and 1502 are populated. Alternatively, it would be possible for telephone numbers to be recorded in a separate linked table.

Columns 1503 to 1508 only become populated after a registration process. Thus, a given name and a family name are recorded at columns 1503 and 1504 respectively in response to receiving free text entries 1402 and 1403.

Gender is recorded at 1505 (from entry 1404), with city, entertainment and hobbies being recorded at 1506, 1507 and 1508, in response to entries from 1405, 1406 and 1407.

Figure 16:
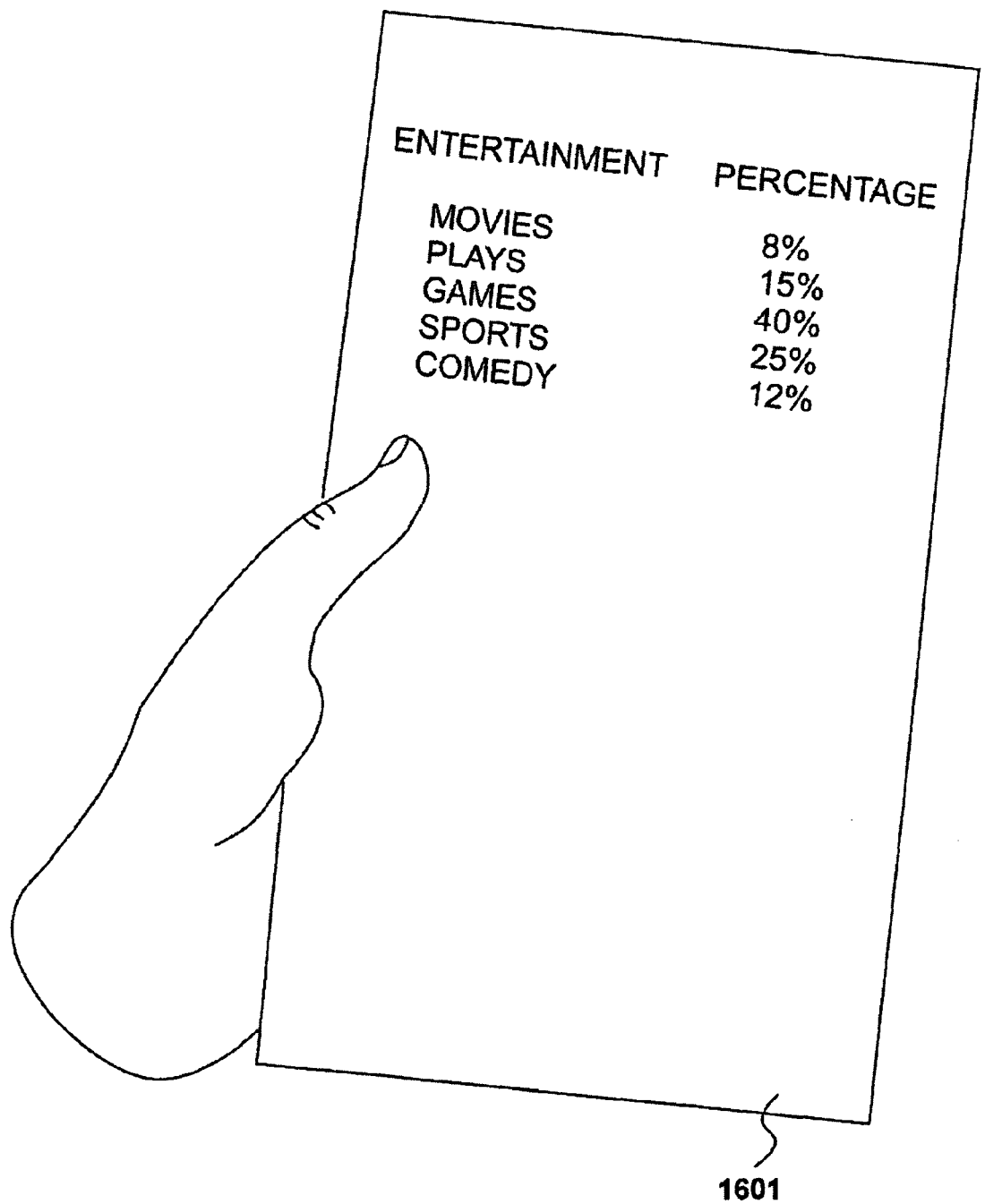
FIG. 16 shows the generation of a report.

FIG. 16 shows the generation of a report. It is envisaged that personal data will be collected over a period of time and a plurality of tables may be included within a database of substantially similar configuration to that shown in FIG. 15. Registered users are identified as such, and in a preferred embodiment the user is provided with a discount each time the service is used. As previously described with respect to FIG. 10, the possibility of providing an additional charges for the service was described, and in a preferred embodiment this charge may be made against nonregistered users whereas registered users may be able to make use of the service for free.

Similarly, suppliers, such as supplier 111, may be in a position to make use of the service effectively for free, but a charge may be required if they wish to obtain user transaction data, essentially for marketing purposes. In a preferred embodiment, it is possible for a supplier to receive transaction data relating to the specific transactions made with them. Alternatively, average data may be of greater assistance such that specific telephone numbers are not required, whereupon it will be possible to provide a broader range of data, including data obtained from transactions relating to other suppliers.

Furthermore, in an alternative preferred embodiment, given that the personal nature of the data has been removed, it would be possible for this accumulated data to be made available to external parties not actually themselves registered as a supplier. Furthermore, the availability of this data may encourage suppliers to make this service available to their customers.

In a first embodiment it is possible for suppliers to gain access to database 208. Alternatively, it may be possible for the suppliers to receive designated reports, such as report 1601 of the type shown in FIG. 16.

In the example shown in FIG. 16, a supplier is interested in advertising entertainment packages and therefore wishes to know which type of entertainments are preferred by their existing customers. Thus, by referring to the information collected within column 1507, for a number of users, it is possible to perform calculations to determine percentages. Thus, in this example, the supplier receives information to the effect that 40% of their users prefer playing computer games, compared to the other options of watching movies, watching plays, watching sports or watching comedy. Thus, with this information on hand, the supplier may make an educated decision to the effect that further website promotions would best be directed at computer games in preference to DVDs and movie downloads, etc.

FIG. 17 details a table in database 208, which includes a table for recording each financial transaction. Nonregistered use as indicated at 1101 and registered use as indicated at 1104 result in the table shown in FIG. 17 being populated.

Table 1701 includes a first column 1702 for recording the identity of the user. Thus, in this example, each user is given a unique number.

The supplier from whom the user is purchasing product/service is identified in column 1703, followed by an indication of the product 1704. Column 1705 records a net price and column 1706 records a discount from the net price. This discount represents a discount given for being a registered user and does not relate to any discounts given by the supplier themselves; these being included in the net price figure. Thus, thereafter, column 1707 records an actual price.

In this example, user 4781 has purchased product from supplier Smith, Jones and Big Inc. Thus a total of three products have been purchased, identified in this example as P2, P4 and P5.

Figure 18:
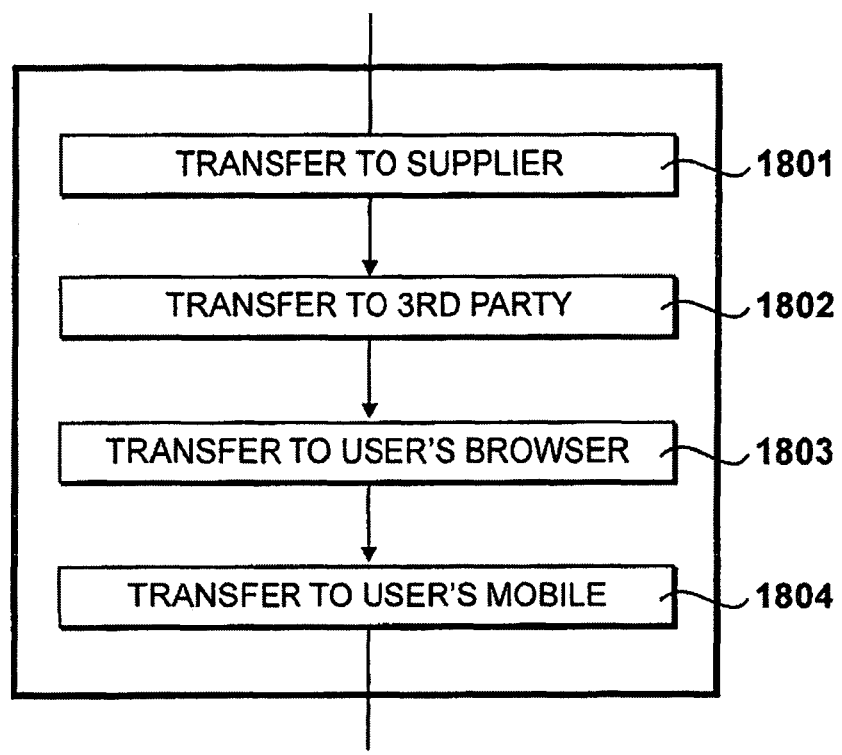
FIG. 18 shows an example of procedures for the transfer of information.

FIG. 18 shows an example of procedures for the transfer of information, as indicated in operation 1105.

In operation 1801, information is transferred to a supplier over channel 209, for example. This may result in the supplier receiving customer related information such as that illustrated in FIG. 16.

In operation 1802 information is supplied to third parties. This information is aggregated and does not identify specific customers. The third party does not necessarily make use of the service but it is possible for the third party to obtain this information for a price.

In operation 1803 details of the user's transactions are transferred to the user's browser. Thus, in a preferred embodiment, it may be possible for registered users to obtain this information without additional charge.

In operation 1804 the transfer of user information to a user's mobile cellular telephone is illustrated. This may be available without charge, or a predetermined number of transmissions per month may be available without charge, after which a charge will be made to the user.

Figure 19:
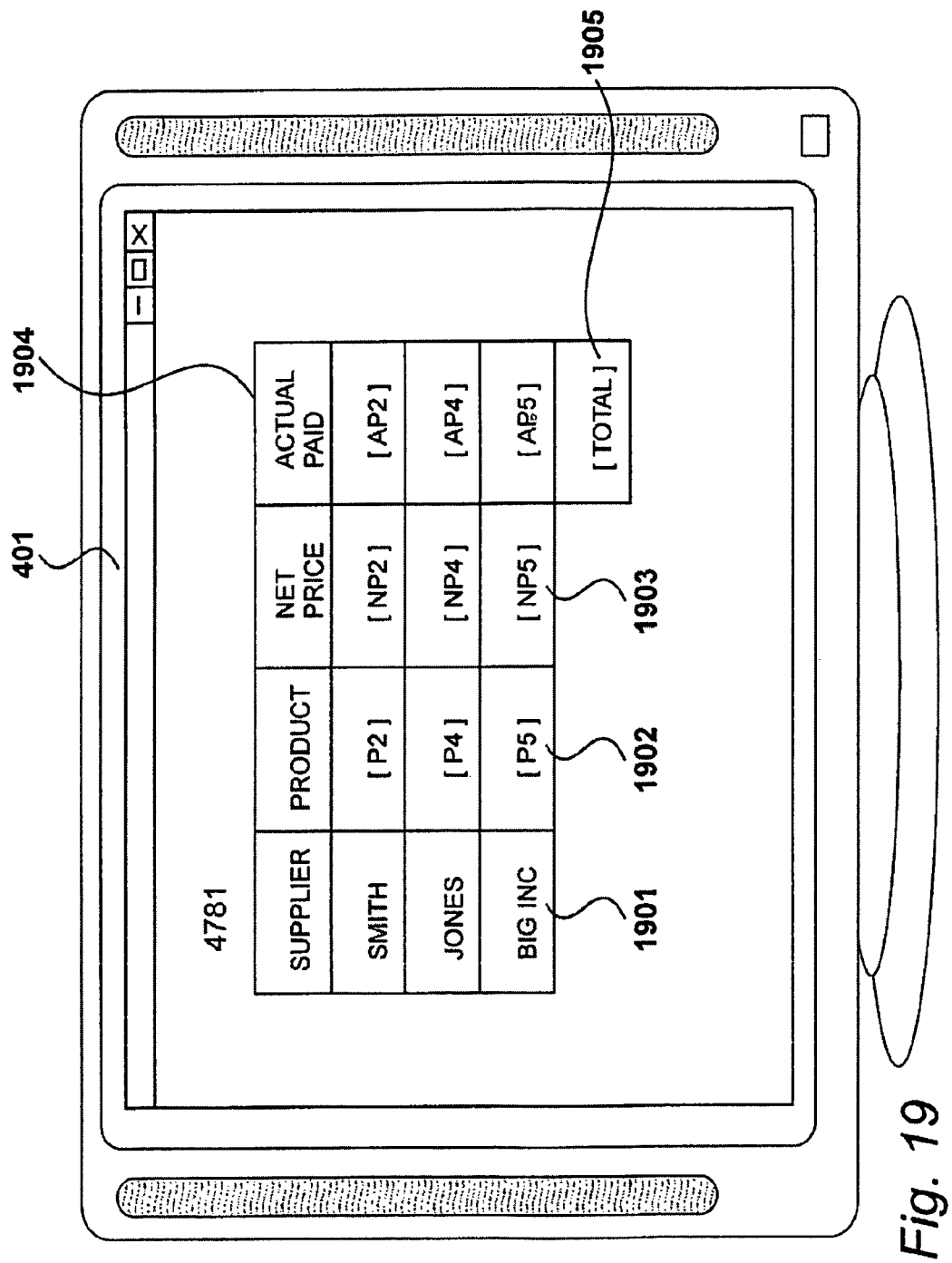
FIG. 19 illustrates the transfer of information to a user's browser.

Operation 1803 for the transfer of information to the user's browser results in data being displayed at the user's browser as shown in FIG. 19.

User 4781 logs on to the appropriate website and supplies appropriate information to allow the log on procedure to be completed. Thus, for example, it is likely that a user would identify their telephone and a password. Thus, having entered this information, details of recent transactions are supplied to the user.

In the example shown, a statement takes the form of a table. This includes a first column 1901 for identifying the name of the supplier, a second table 1902 for identifying the product, a third table 1903 for identifying the net price and a fourth table 1904 for identifying the actual amount paid.

As it can be seen from FIG. 19, the totality of the data available in table 1701 has been filtered so as to show only the transactions for user 781. Furthermore, in this example, the actual discount figure (from column 1706) is not included. However, the system does identify the actual price paid and at 1905 a total is included, possibly for all transactions up to transactions included on the last mobile telephone statement. Thus, a payment is made for mobile telephone services as illustrated at 210, resulting in the transactional data being recorded as paid. Thereafter, in the preferred embodiment, only unpaid transactions are included. In this way, it is possible for a user to be kept up to date as to where they stand in anticipation of the next mobile cellular bill. Furthermore, in an alternative embodiment it is possible for a user to obtain historical records, possibly on a monthly basis.

Figure 20:
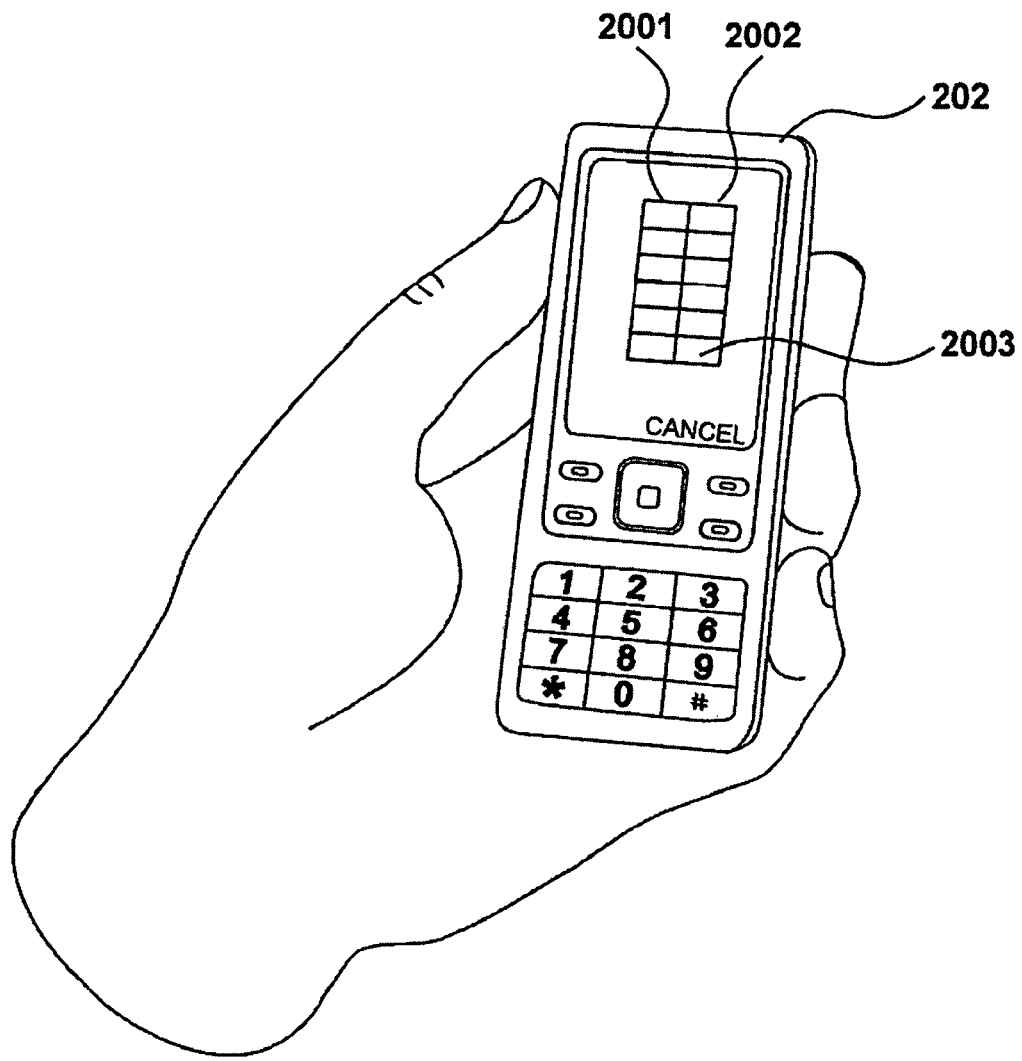
FIG. 20 shows the display of information at a user's mobile cellular telephone.

In response to the transfer of data to the user's mobile telephone, as identified in operation 1804, information is displayed on the mobile cellular telephone 202, as shown in FIG. 20. In this example, the information is shown in a table having a first column 2001 and a second column 2002. In this example, column 2001 identifies the product (P2, P4, P5 etc) and column 2002 shows the actual price paid AP2, AP4 and AP5 etc. The mobile telephone display may also include a total, shown at 2003, which would be of particular use to users given that it would indicate how much they have spent in a particular month so as to assist them with budgeting.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. An apparatus to electronically transfer funds from a customer to a supplier, the customer having a mobile cellular telephone with a telephone number, a mobile cellular operator providing mobile cellular services to the mobile cellular telephone, a customer browser component connected to a network, a supplier browser component connected to the network, the apparatus comprising:
   a server component connected to the network; and
   a database component coupled to the server component, wherein the server component is configured to:
   transmit a message to the mobile cellular telephone to request a confirmation after the customer has placed an order with the supplier;
   in response to the confirmation, calculate an amount of the order;
   populate the database component with an identification of the telephone number of the customer;
   transmit a message to the mobile cellular telephone for the customer to select whether a discount is required;
   receive a message from the mobile cellular telephone with a selection of whether the discount is required or not required;
   if the discount is required, register the customer by prompting the customer to supply additional personal data, and populating the database component with the additional personal data against the telephone number in response to the additional personal data, and applying the discount to the amount; and
   transmitting at least one message to effect a payment from the customer for the amount as modified by the discount if the customer has been registered.

2. The apparatus of claim 1, wherein the server component is configured to transmit the plurality of premium rate mobile terminating text messages spread over a number of days.

3. The apparatus of claim 1, wherein the customer is prompted to supply further information about the customer via the customer browser component.

4. The apparatus of claim 1, wherein the server component is configured to provide to the supplier browser information derived from the additional data received from the customer.

5. The apparatus of claim 1, wherein the server component is configured to use the database component to store the additional data received from the customer.

6. A method to transfer funds electronically, the method comprising:
   transmitting, from a server computer, a message to a mobile cellular telephone at a telephone number of a customer to request a confirmation after the customer has placed an order with a supplier;
   in response to the confirmation, calculating an amount of the order;
   populating a database at the server computer with an identification of the telephone number;
   transmitting a message to the mobile cellular telephone for the customer to select whether a discount is required;
   receiving a message from the mobile cellular telephone with a selection of whether the discount is required or not required;
   if the discount is required, registering the customer by prompting the customer to supply additional personal data, and populating the database component with the additional personal data against the telephone number in response to the additional personal data, and applying the discount to the amount; and
   transmitting at least one message to effect a payment from the customer for the amount as modified by the discount if the customer has been registered.

7. The method of claim 6, further comprising scheduling transmission of the premium rate mobile terminating text messages to avoid exceeding a pre-established maximum daily limit.

8. The method of claim 6, further comprising prompting the customer to supply further information about the customer via the browser.

9. The method of claim 6, further comprising supplying to the supplier information derived from the additional personal data received from the customer.

10. The method of claim 6, further comprising storing the additional personal data within the database.

11. A computer-readable medium having computer-readable instructions, the instructions causing a computer to perform a method, the method comprising:

transmitting, from the computer, a message to a mobile cellular telephone at a telephone number of a customer to request a confirmation after the customer has placed an order with a supplier;

in response to the confirmation, calculating an amount of the order;

populating a database at the server computer with an identification of the telephone number;

transmitting a message to the mobile cellular telephone for the customer to select whether a discount is required;

receiving a message from the mobile cellular telephone with a selection of whether the discount is required or not required;

if the discount is required, registering the customer by prompting the customer to supply additional personal data, and populating the database component with the additional personal data against the telephone number in response to the additional personal data, and applying the discount to the amount; and transmitting at least one message to effect a payment from the customer for the amount as modified by the discount if the customer has been registered.

12. The computer-readable medium of claim 11, wherein the method further comprises scheduling transmission of the at least one message to avoid exceeding a pre-established maximum daily limit.

13. The computer-readable medium of claim 11, wherein the method further comprises prompting the customer to supply further information about the customer via the browser.

14. The computer-readable medium of claim 11, wherein the method further comprises providing to the supplier information derived from the additional personal data received from the customer.

15. The computer-readable medium of claim 11, wherein the method further comprises storing the additional personal data within the database.

* * * * *